United States Patent
Zeng

(10) Patent No.: US 11,893,785 B2
(45) Date of Patent: Feb. 6, 2024

(54) OBJECT ANNOTATION METHOD AND APPARATUS, MOVEMENT CONTROL METHOD AND APPARATUS, DEVICE, AND STORAGE MEDIUM

(71) Applicant: TENCENT TECHNOLOGY (SHENZHEN) COMPANY LIMITED, Shenzhen (CN)

(72) Inventor: Chao Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 696 days.

(21) Appl. No.: 17/071,969

(22) Filed: Oct. 15, 2020

(65) Prior Publication Data
US 2021/0043002 A1 Feb. 11, 2021

Related U.S. Application Data

(63) Continuation of application No. PCT/CN2019/105049, filed on Sep. 10, 2019.

(30) Foreign Application Priority Data

Sep. 11, 2018 (CN) .......................... 201811060480.5

(51) Int. Cl.
*G06T 9/00* (2006.01)
*G06V 20/10* (2022.01)
(Continued)

(52) U.S. Cl.
CPC ................ *G06V 20/10* (2022.01); *G06T 7/74* (2017.01); *G06T 19/00* (2013.01); *G06V 10/25* (2022.01);
(Continued)

(58) Field of Classification Search
CPC ........ G06V 20/10; G06V 10/25; G06V 20/58; G06V 20/70; G06V 2201/121; G06T 7/74;
(Continued)

(56) References Cited

U.S. PATENT DOCUMENTS 10,552,691 B2 2/2020 Li et al.
2015/0276379 A1* 10/2015 Ni ........................... G06T 7/564
382/154

(Continued)

FOREIGN PATENT DOCUMENTS

CN 104680532 A 6/2015
CN 106971403 A 7/2017
(Continued)

OTHER PUBLICATIONS

The European Patent Office (EPO) Office Action 1 for for 19861154.3 dated Oct. 13, 2021 10 Pages.
(Continued)

*Primary Examiner* — Jerome Grant, II
(74) *Attorney, Agent, or Firm* — ANOVA LAW GROUP, PLLC

(57) ABSTRACT

Embodiments of this application disclose an object annotation method and apparatus, a movement control method and apparatus, a device, and a storage medium. The method includes: obtaining a reference image recorded by an image sensor from an environment space, the reference image comprising at least one reference object; obtaining target point cloud data obtained by a three-dimensional space sensor by scanning the environment space, the target point cloud data indicating a three-dimensional space region occupied by a target object in the environment space; determining a target reference object corresponding to the target object from the reference image; determining a projection
(Continued)

size of the three-dimensional space region corresponding to the target point cloud data and the three-dimensional space region being projected onto the reference image; and performing three-dimensional annotation on the target reference object in the reference image according to the determined projection size.

20 Claims, 10 Drawing Sheets

(51) Int. Cl.
  *G06T 7/73* (2017.01)
  *G06T 19/00* (2011.01)
  *G06V 10/25* (2022.01)
  *G06V 20/70* (2022.01)
  *G06V 20/58* (2022.01)

(52) U.S. Cl.
  CPC .............. *G06V 20/58* (2022.01); *G06V 20/70* (2022.01); *G06T 2207/10028* (2013.01); *G06T 2219/004* (2013.01)

(58) Field of Classification Search
  CPC ........... G06T 19/00; G06T 2207/10028; G06T 2219/004; G06T 7/60; G06T 2207/20068; G06T 2207/30248
  USPC ........................................................ 382/154
  See application file for complete search history.

(56) References Cited

U.S. PATENT DOCUMENTS

| | | |
|---|---|---|
| 2018/0089536 A1 | 3/2018 | Feng et al. |
| 2018/0136332 A1 | 5/2018 | Barfield, Jr. et al. |
| 2021/0043002 A1 | 2/2021 | Zeng |

FOREIGN PATENT DOCUMENTS

| | | | | |
|---|---|---|---|---|
| CN | 107784038 A | | 3/2018 | |
| CN | 107798010 A | | 3/2018 | |
| CN | 107816976 A | | 3/2018 | |
| CN | 107871129 | * | 4/2018 | ............ G06V 10/25 |
| CN | 107871129 A | | 4/2018 | |
| CN | 108154560 A | | 6/2018 | |
| CN | 108416804 | * | 8/2018 | ............ G06T 7/11 |
| CN | 108416804 A | | 8/2018 | |
| CN | 110163904 A | | 8/2019 | |
| JP | 6293386 | * | 3/2018 | ............ G06T 19/00 |
| JP | 2020123062 | * | 8/2020 | ............ G06F 3/12 |
| TW | 201250626 | * | 12/2012 | ............ G06T 7/215 |

OTHER PUBLICATIONS

The State Intellectual Property Office of the People's Republic of China (SIPO) Office Action 1 for for 201811060480.5 dated Dec. 29, 2021 14 Pages (including translation).
The World Intellectual Property Organization (WIPO) International Search Report for PCT/CN2019/105049 dated Nov. 27, 2019 6 Pages (including translation).

* cited by examiner

OBJECT ANNOTATION METHOD AND APPARATUS, MOVEMENT CONTROL METHOD AND APPARATUS, DEVICE, AND STORAGE MEDIUM

RELATED APPLICATIONS

This application claims priority to PCT Application No. PCT/CN2019/105049, filed on Sep. 10, 2019, which in turn claims priority to Chinese Patent Application No. 201811060480.5, entitled "OBJECT ANNOTATION METHOD AND APPARATUS, MOVEMENT CONTROL METHOD AND APPARATUS, DEVICE, AND STORAGE MEDIUM" and filed with the National Intellectual Property Administration, PRC on Sep. 11, 2018. The two applications are both incorporated herein by reference in their entirety.

FIELD OF THE TECHNOLOGY

This application relates to the field of computer technologies, and in particular, to an object annotation method and apparatus, a movement control method and apparatus, a device, and a storage medium.

BACKGROUND OF THE DISCLOSURE

With the development of machine learning (ML), image annotation has become a popular research subject. 3D object image annotation in the field of image annotation is particularly important. 3D object image annotation refers to an annotation method, including obtaining laser point cloud data at the same moment by performing 3D laser scanning on a target object (for example, a vehicle, a bicycle, or a pedestrian) in an image, annotating a stereoscopic enclosing box of the object in a 3D space by using the laser point cloud data, and projecting the stereoscopic enclosing box onto the image. How to better perform three-dimensional annotation on the target object in the image has become a research hotspot.

SUMMARY

Embodiments of this application provide an object annotation method and apparatus, a movement control method and apparatus, a control device, and a storage medium, so that three-dimensional annotation can be better performed on the target object, to accurately determine an actual location of the object.

One aspect of the present disclosure provides an object annotation method. The method includes: obtaining a reference image recorded by an image sensor from an environment space, the reference image comprising at least one reference object; obtaining target point cloud data obtained by a three-dimensional space sensor by scanning the environment space, the target point cloud data indicating a three-dimensional space region occupied by a target object in the environment space; determining a target reference object corresponding to the target object from the reference image; determining a projection size of the three-dimensional space region corresponding to the target point cloud data and the three-dimensional space region being projected onto the reference image; and performing three-dimensional annotation on the target reference object in the reference image according to the determined projection size.

Another aspect of the present disclosure provides a movement control method. The method includes obtaining, in a moving process of a mobile platform, a reference image that is recorded from an environment space, and obtaining target point cloud data obtained by scanning the environment space, the target point cloud data indicating a three-dimensional space region occupied by a target object in the environment space; performing three-dimensional annotation on at least one reference object in the reference image according to the target object and the target point cloud data, to obtain a three-dimensional annotation region; performing image recognition on the three-dimensional annotation region in the reference image, to determine parameter information of a target reference object in the three-dimensional annotation region; and generating a control instruction according to the parameter information, and controlling the mobile platform according to the control instruction.

Another aspect of the present disclosure provides a movement control apparatus. The movement control apparatus includes a memory storing computer readable instructions and a processor. When executing the computer readable instructions, the processor is configured to obtain, in a moving process of a mobile platform, a reference image that is recorded from an environment space, and obtain target point cloud data obtained by scanning the environment space, the target point cloud data indicating a three-dimensional space region occupied by a target object in the environment space; perform three-dimensional annotation on at least one reference object in the reference image according to the target object and the target point cloud data, to obtain a three-dimensional annotation region; perform image recognition on the three-dimensional annotation region in the reference image, to determine parameter information of a target reference object in the three-dimensional annotation region; and generate a control instruction according to the parameter information, and control the mobile platform according to the control instruction.

Another aspect of the present disclosure provides a movement control apparatus. The movement control apparatus, comprising: an obtaining unit, configured to obtain, in a moving process of a mobile platform, a reference image that is recorded from an environment space, and obtain target point cloud data obtained by scanning the environment space, the target point cloud data indicating a three-dimensional space region occupied by a target object in the environment space; an annotation unit, configured to perform three-dimensional annotation on at least one reference object in the reference image according to the target object and the target point cloud data, to obtain a three-dimensional annotation region; a recognition unit, configured to perform image recognition on the three-dimensional annotation region in the reference image, to determine parameter information of a target reference object in the three-dimensional annotation region; and a control unit, configured to generate a control instruction according to the parameter information, and control the mobile platform according to the control instruction.

Another aspect of the present disclosure provides a non-transitory computer storage medium, the computer storage medium storing a computer program instruction that, when executed, cause a processor to perform: obtaining a reference image recorded by an image sensor from an environment space, the reference image comprising at least one reference object; obtaining target point cloud data obtained by a three-dimensional space sensor by scanning the environment space, the target point cloud data indicating a three-dimensional space region occupied by a target object in the environment space; determining a target reference object corresponding to the target object from the reference image; determining a projection size of the three-dimensional space region corresponding to the target point cloud data and the three-dimensional space region being projected onto the reference image; and performing three-dimensional annotation on the target reference object in the reference image according to the determined projection size.

Another aspect of the present disclosure provides a non-transitory computer storage medium, the computer storage medium storing a computer program instruction that, when executed, cause a processor to perform: obtaining, in a moving process of a mobile platform, a reference image that is recorded from an environment space, and obtaining target point cloud data obtained by scanning the environment space, the target point cloud data indicating a three-dimensional space region occupied by a target object in the environment space; performing three-dimensional annotation on at least one reference object in the reference image according to the target object and the target point cloud data, to obtain a three-dimensional annotation region; performing image recognition on the three-dimensional annotation region in the reference image, to determine parameter information of a target reference object in the three-dimensional annotation region; and generating a control instruction according to the parameter information, and controlling the mobile platform according to the control instruction.

According to a further aspect, an embodiment of this application provides a non-transitory computer storage medium, the computer storage medium storing a first computer program instruction, the first computer program instruction, when executed, being used for implementing the foregoing object annotation method; or the computer storage medium storing a second computer program instruction, the second computer program instruction, when executed, being used for implementing the foregoing movement control method.

When three-dimensional annotation is performed on an object in the embodiments of this application, target point cloud data of a target object may be obtained, a projection size of a three-dimensional space region corresponding to the target point cloud data and being projected onto a reference image is determined, and then three-dimensional annotation is performed on a target reference object, in the reference image, matching the target object according to the projection size, to accurately determine, in a three-dimensional space, a location of the target reference object in a two-dimensional image. By performing three-dimensional annotation on the target reference object in the reference image according to the target point cloud data, the annotation accuracy may be improved, an actual location of the target reference object may be accurately determined, and annotation does not need to be performed manually. Embodiments of the present disclosure can thus improve the annotation efficiency, and reduce the cost of annotation.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from the accompanying drawings without creative efforts.

DESCRIPTION OF EMBODIMENTS

The embodiments of this application provide an object annotation method. In the object annotation method, three-dimensional annotation may be performed on an object in a planar image. In the embodiments of this application, a three-dimensional space sensor of a type such as laser, ultrasonic waves, or radar may scan an environment space to obtain three-dimensional point cloud data of an object, and then three-dimensional annotation is performed on a two-dimensional planar image based on the three-dimensional point cloud data.

Figure 1:
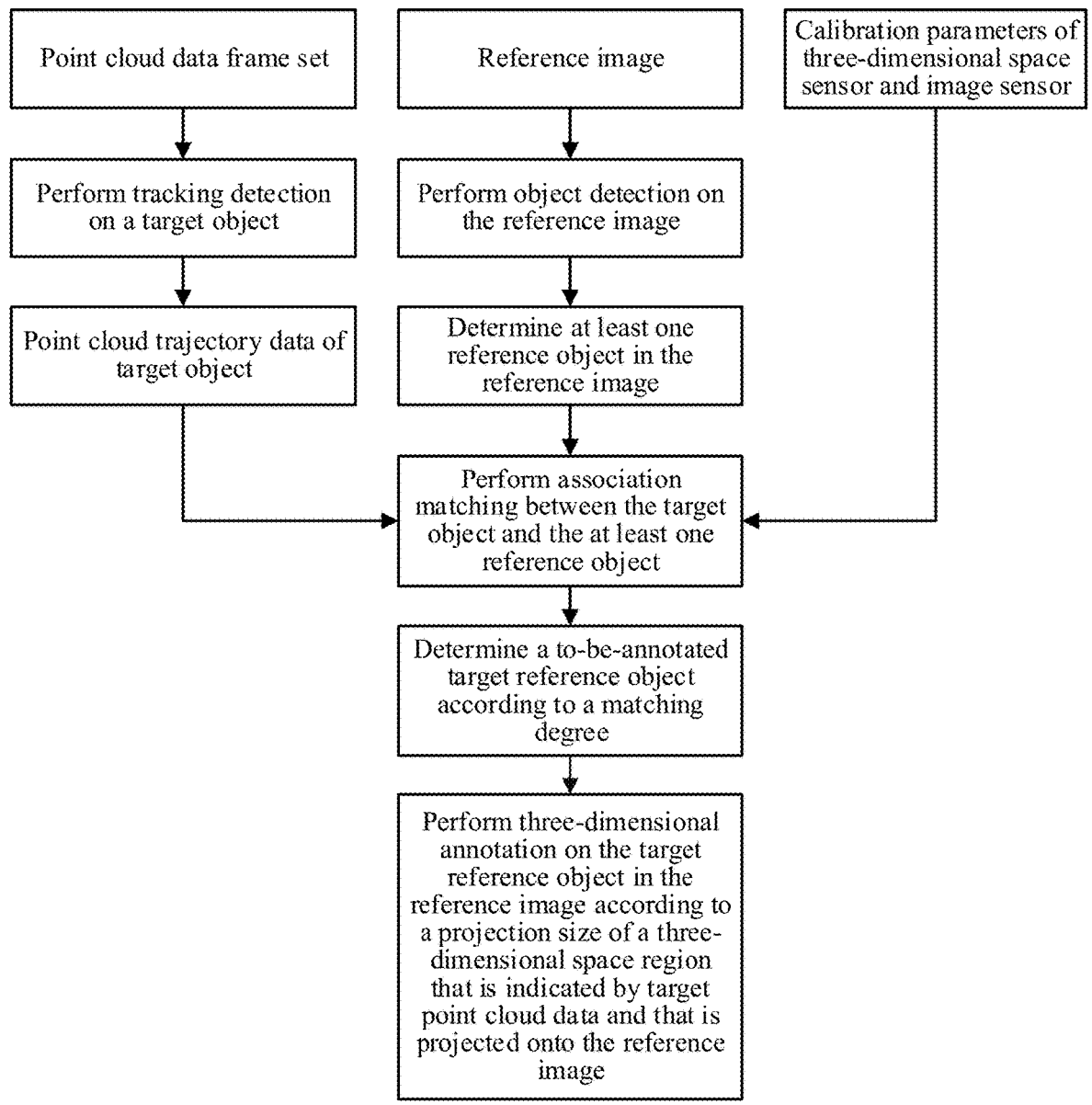
FIG. 1 is a schematic flowchart of an object annotation method according to an embodiment of this application.

As shown in FIG. 1, when three-dimensional annotation is performed on an object in a planar image, a point cloud data frame set may be obtained, and tracking may be performed on a target object based on the point cloud data frame set, to obtain point cloud trajectory data of the target object. The point cloud trajectory data may be data that is formed by point cloud data of the target object at different moments and that indicates a moving trajectory of the target object, and location information, direction information, speed information, and the like of the target object may be determined based on point cloud data. In addition, a reference image (for example, a planar image such as an environment image) may also be obtained by using an image sensor such as various types of cameras, and object detection may be performed on the reference image based on an image-based target detection method such as a method based on a deformable parts model (DPM), to determine at least one reference object in the reference image. Further, association matching is performed between the target object and the at least one reference object based on information such as a calibration parameter between the three-dimensional space sensor and the image sensor, and the point cloud trajectory data of the target object, to obtain a matching degree between the target object and the at least one reference object. A to-be-annotated target reference object may be determined according to the matching degree. The target reference object may be understood as an object, in the reference image, corresponding to a target object scanned by the three-dimensional space sensor. Finally, three-dimensional annotation is performed on the target reference object in the reference image according to a projection size of a three-dimensional space region corresponding to target point cloud data and that is projected onto the reference image.

Figure 2:
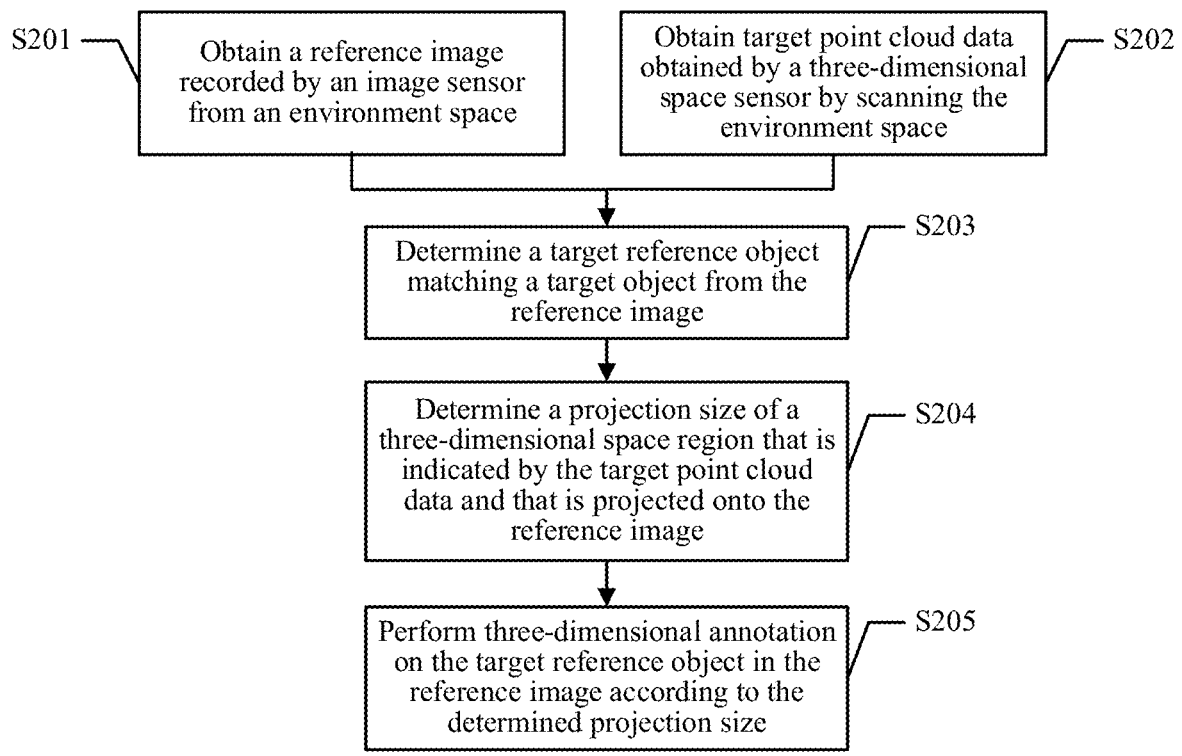
FIG. 2 is a schematic flowchart of an object annotation method according to another embodiment of this application.

FIG. 2 provides a schematic flowchart of an object annotation method in one embodiment of the present disclosure. The object annotation method in the embodiments of this application may be implemented by a control device. The control device herein may be an intelligent terminal, for example, a mobile intelligent terminal such as a smartphone or a tablet computer, or a desktop computer. The intelligent terminal may be used as a part of a mobile platform, and disposed on the mobile platform, or may be an external independent terminal device, and connected to the mobile platform. In other embodiments, the control device may further be some mobile platforms moving automatically based on image recognition, for example, a driverless car, a robot, and an unmanned aerial vehicle (UAV) that are provided with a processor.

In the embodiments of this application, the control device is an intelligent terminal, and the intelligent terminal is disposed on a mobile platform is used. The intelligent terminal may control the corresponding mobile platform to move securely. The mobile platform may be provided with a three-dimensional space sensor and an image sensor. In a moving process of the mobile platform, the mobile platform may call the three-dimensional space sensor to scan a target object in the environment space, to obtain a point cloud data frame set. The point cloud data frame set may include target point cloud data of the target object. Alternatively, the mobile platform may call the image sensor to shoot the target object (for example, a vehicle or a pedestrian) in the environment space, to obtain a large quantity of recorded images. In the embodiments of this application, a timestamp is one piece of data that is complete and verifiable, and that is capable of indicating that one piece of data already exists at a specific time, which is usually a character sequence and can uniquely identify a time of a moment. Therefore, when the image sensor obtains a recorded image, and the three-dimensional space sensor obtains a point cloud data frame, a recording timestamp may be generated for the recorded image, to record an image recording moment of the recorded image.

After the intelligent terminal detects a trigger event of object annotation, in step S201, the intelligent terminal may obtain a reference image recorded by the image sensor from the environment space, and the reference image herein includes at least one reference object. The trigger event herein may include: an annotation instruction for performing three-dimensional annotation on a target reference object in a reference image or an event, for example, a work mode of automatically performing three-dimensional annotation is enabled. Specifically, the intelligent terminal may automatically obtain a large quantity of recorded images recorded by the image sensor from the image sensor, and may arbitrarily select one or more frames of recorded images from the large quantity of recorded images as the reference image.

In one embodiment, in a moving process of the mobile platform, the intelligent terminal disposed on the mobile platform may obtain, in real time or periodically, recorded images recorded by the image sensor from the environment space, and store the obtained recorded images in a memory or a database. When detecting a trigger event of object annotation, the intelligent terminal may obtain the recorded images from the memory or the database, and arbitrarily select one or more frames of recorded images from the recorded images as the reference image. In other embodiments, the intelligent terminal may alternatively directly obtain the reference image from the mobile platform.

After detecting the trigger event of the object annotation, in step S202, the intelligent terminal may further obtain target point cloud data obtained by the three-dimensional space sensor by scanning the environment space. The target point cloud data herein is used for indicating a three-dimensional space region occupied by a target object in the environment space, and a data acquisition moment of the target point cloud data may be the same as an image recording moment of the reference image. Specifically, the intelligent terminal may automatically obtain, from the three-dimensional space sensor, a point cloud data frame set obtained through scanning by the three-dimensional space sensor, and may track the target object based on the point cloud data frame set, to determine point cloud trajectory data of the target object; and then perform a series of operations such as searching and interpolation processing on the point cloud trajectory data, to obtain target point cloud data. The interpolation processing herein is processing of estimating the target point cloud data by using known point cloud data.

In one embodiment, in a moving process of the mobile platform, the intelligent terminal may obtain, in real time or periodically, a point cloud data frame set obtained through scanning by the three-dimensional space sensor, and store the obtained point cloud data frame set in a memory or a database. When detecting a trigger event of object annotation, the intelligent terminal may obtain the point cloud data frame set from the memory or the database, and perform a series of operations such as tracking, searching, and interpolation processing on the target object based on the point cloud data frame set, to obtain the target point cloud data. In other embodiments, the intelligent terminal may alternatively directly obtain the target point cloud data from the mobile platform. Step S201 and step S202 may be simultaneously performed. In other embodiments, step S201 may be first performed and then step S202 is performed. Alternatively, step S202 may be first performed and then step S201 is performed. A sequence in which step S201 and step S202 are performed is not limited in the embodiments of this application.

After obtaining the reference image, in step S203, the intelligent terminal may determine a target reference object corresponding to the target object from the reference image. A matching degree between the target reference object and the target object herein is greater than a preset threshold, and the target reference object may be considered as an object corresponding to the target object in the reference image. Specifically, after obtaining the reference image, the intelligent terminal may perform image detection on the reference image by using a target detection method, to determine at least one reference object in the reference image. The target detection method herein includes, but is not limited to: a method with a histogram of oriented gradient (HOG)

feature and a support vector machine (SVM) classifier, a method based on a deep neural network (the deep neural network may include a single recorded multi box detector (SSD) and you only look once (YOLO), and another network), and a method based on a DPM.

After determining the at least one reference object in the reference image, the intelligent terminal may perform matching between the target object and the at least one reference object, and determine a target reference object according to a matching result. The matching result may include a matching degree between the target object and each reference object, and a reference object corresponding to a matching degree greater than a threshold is determined as the target reference object. In one embodiment, performing matching between the target object and the at least one reference object may be: first projecting the three-dimensional space region indicated by the target point cloud data of the target object onto the reference image, to determine an image projection region; and then performing matching between the image projection region and an image reference region occupied by the at least one reference object in the reference image, to obtain a matching result.

After the target point cloud data is obtained, in step S204, a projection size of the three-dimensional space region corresponding to the target point cloud data and that is projected onto the reference image may further be determined. The projection size may include a height value, a length value, and a width value, that is, the projection size may be a size of a three-dimensional enclosing box. There may be a projection proportional relationship between an actual size (meter) of the three-dimensional space region indicated by the target point cloud data and the projection size (pixel), and the projection proportional relationship may be related to a resolution of the reference image. For example, if the projection proportional relationship is 1:50, assuming that an actual height value of the three-dimensional space region is 3 meters, the height value of the projection size is 150 pixels. There is no sequence between step S204 and step S203. In other embodiments, step S204 and step S203 may be simultaneously performed. After the projection size is determined, in step S205, three-dimensional annotation may be performed on the target reference object in the reference image according to the determined projection size. Then, a location of the target reference object in a three-dimensional space may be determined according to the three-dimensional annotation.

When three-dimensional annotation is performed on an object in the embodiments of this application, target point cloud data of a target object may be obtained, a projection size of a three-dimensional space region corresponding to the target point cloud data and that is projected onto a reference image is determined, and then three-dimensional annotation is performed on a target reference object, in the reference image, matching the target object according to the projection size, to accurately determine a location of the target reference object, in a two-dimensional image, in a three-dimensional space. By performing three-dimensional annotation on the target reference object in the reference image according to the target point cloud data, the annotation accuracy may be improved, an actual location of the target reference object may be accurately determined, and annotation does not need to be performed manually, which can improve the annotation efficiency, and reduce the cost of annotation.

Figure 3:
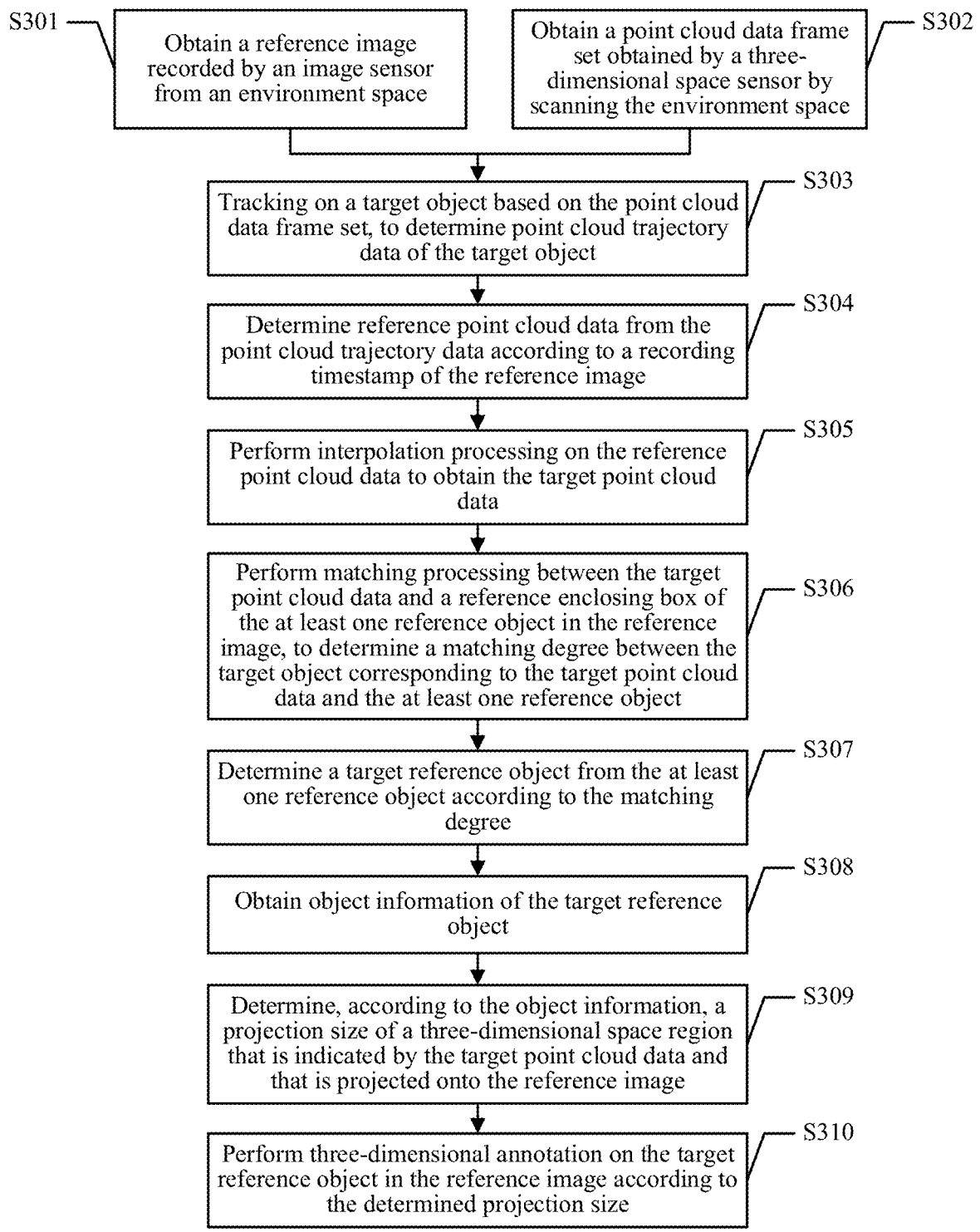
FIG. 3 is a schematic flowchart of an object annotation method according to another embodiment of this application.

In another embodiment, when three-dimensional annotation is performed on an object in the reference image, the embodiments of this application may follow the process outlined in a schematic flowchart shown in FIG. 3. The object annotation method in the embodiments of this application may be implemented by a control device. The control device herein may be an intelligent terminal, for example, a mobile intelligent terminal such as a smartphone or a tablet computer, or a desktop computer. The intelligent terminal may be used as a part of a mobile platform, and disposed on the mobile platform, or may be an external independent terminal device, and connected to the mobile platform. In other embodiments, the control device may further be some mobile platforms automatically moving based on image recognition, for example, a driverless car, a robot, and a UAV that are provided with a processor. In the embodiments of this application, an example in which the control device is an intelligent terminal, and the intelligent terminal is disposed on a mobile platform is used.

After detecting a trigger event of object annotation, in step S301, the intelligent terminal may obtain a reference image recorded by an image sensor from an environment space. The reference image includes at least one reference object. Specifically, the reference image may be automatically obtained from the image sensor. In one embodiment, in a moving process of the mobile platform, the intelligent terminal may obtain, in real time or periodically, recorded images recorded by the image sensor from the environment space, and store the obtained recorded images in a memory or a database. When detecting a trigger event of object annotation, the intelligent terminal may obtain the recorded images from the memory or the database, and arbitrarily select one or more frames of recorded images from the recorded images as the reference image.

After the trigger event of the object annotation is detected, in step S302, a point cloud data frame set obtained by a three-dimensional space sensor by scanning the environment space may further be obtained. The point cloud data frame set may be automatically obtained from the three-dimensional space sensor. In one embodiment, in a moving process of the mobile platform, the intelligent terminal may obtain, in real time or periodically, a point cloud data frame set obtained through scanning by the three-dimensional space sensor, and store the obtained point cloud data frame set in a memory or a database. When the trigger event of object annotation is detected, the point cloud data frame set may be obtained from the memory or the database. Step S301 and step S302 may be simultaneously performed. In other embodiments, step S301 may be first performed and then step S302 is performed. Alternatively, step S302 may be first performed and then step S301 is performed. A sequence in which step S301 and step S302 are performed is not limited in the embodiments of this application.

After the point cloud data frame set is obtained, in step S303, tracking may be performed on the target object based on the point cloud data frame set, to determine point cloud trajectory data of the target object. The point cloud data frame set herein may include at least two point cloud data frames. Object detection may be first performed on a target point cloud data frame, to determine the target object, the target point cloud data frame being any point cloud data frame in the point cloud data frame set. In one embodiment, the object detection may be performed on the target point cloud data frame by using a single-frame target detection method. The single-frame target detection method herein may include, but is not limited to: a conventional point cloud segmentation clustering method and a target detection method based on deep learning such as a method based on a multi-view 3D object detection network for autonomous driving (MV3D) model, a method based on a Voxel model, and a method based on a Pointnet model. The conventional point cloud segmentation clustering method usually includes the following procedures: first performing ground filtering, to obtain non-ground points; and then performing segmentation clustering and feature extraction on the non-ground points.

After the target object is determined, an associated point cloud data frame associated with the target point cloud data frame may be obtained, and the associated point cloud data frame herein may include one point cloud data frame having an acquisition time earlier or later than that of the target point cloud data frame. Tracking processing is performed on the target object based on the associated point cloud data frame, to determine the point cloud trajectory data of the target object. In an embodiment, in the associated point cloud data frame, matching and tracking of the target object may be performed, through a target tracking algorithm, on the target object obtained by detecting the target point cloud data frame, to obtain the point cloud trajectory data of the target object. The target tracking algorithm herein may include, but is not limited to: a target tracking algorithm based on a mean shift algorithm, a target tracking algorithm based on a particle filtering algorithm, a target tracking algorithm based on Kalman filtering, a target tracking algorithm based on moving target modeling, and a target tracking algorithm based on a Bayes theory. In other embodiments, the associated point cloud data frame may further be one point cloud data frame that has an acquisition time earlier or later than that of the target point cloud data frame and that is adjacent to the target point cloud data frame.

In one embodiments of this application, the target object may further be classified according to the point cloud trajectory data of the target object, to determine a classification category of the target object. The classification category may be, for example, a big trunk, a bicycle, a pedestrian, or a motorcycle. In a moving process, the collected point cloud data frames may be inaccurate due to factors such as a distance, a viewing angle, and blocking of a shelter at a moment, resulting in an inaccurate classification category obtained by classifying the target object. Therefore, in the embodiments of this application, the target object is classified according to the point cloud trajectory data. As can be learned from the foregoing description, the point cloud trajectory data is data that is formed by point cloud data of the target object at different moments and that indicates a moving trajectory of the target object. The target object is classified by using point cloud data at a plurality of moments, so that accuracy and robustness of the classification category may be improved.

The point cloud data frame set obtained by the intelligent terminal is obtained by the three-dimensional space sensor in advance, and in a moving process, a size of the three-dimensional space region indicated by the point cloud trajectory data of the target object may be inaccurate due to factors such as a distance, a viewing angle, and blocking of a shelter at some moments. Therefore, in one embodiment, when the tracking is performed on the target object based on the point cloud data frame set, bidirectional target tracking optimization may be further performed on the target object. The referenced bidirectional target tracking optimization refers to not only performing tracking filtering processing on the target object from front to back in time domain, but also performing tracking filtering processing on the target object from back to front. By performing the bidirectional target tracking optimization on the target object, it can be ensured that the size of the three-dimensional space region (such as values of a length, width, and height of the three-dimensional space region) indicated by the point cloud trajectory data of the target object and the classification category of the target object (such as a big trunk or a bicycle) are the best.

After the point cloud trajectory data of the target object is obtained, target point cloud data may be found and determined from the point cloud trajectory data. As can be learned from the foregoing description, a data acquisition moment of the target point cloud data is the same as the image recording moment of the reference image, and the reference image has a recording timestamp. The recording timestamp records an image recording moment of the reference image. Therefore, the target point cloud data may be determined from the point cloud trajectory data according to the recording timestamp of the reference image. Specifically, a recording timestamp of the reference image may be first obtained, and in step S304, reference point cloud data is determined from the point cloud trajectory data according to the recording timestamp of the reference image. A data timestamp of the reference point cloud data and the recording timestamp of the reference image meet a preset condition.

In one embodiment, the preset condition herein may be that a timestamp range formed by data timestamps of reference point cloud data includes the recording timestamp of the reference image, and differences between the data timestamps and the recording timestamp are less than a preset difference. For example, a recording timestamp of the reference image is 8:45:45, a data timestamp of point cloud data A is 8:45:40, a data timestamp of point cloud data B is 8:45:50, and a preset difference value is 10 s. Because a timestamp range formed by the data timestamp of the point cloud data A and the data timestamp of the point cloud data B is from 8:45:40 to 8:45:50, including the recording timestamp 8:45:45 of the reference image, and both a difference between the data timestamp of the point cloud data A and the recording timestamp of the reference image and a difference between the data timestamp of the point cloud data B and the recording timestamp of the reference image are 5 s, less than 10 s, both the point cloud data A and the point cloud data B may be used as the reference point cloud data. The listed timestamps are merely examples. In certain embodiments, an acquisition time of one frame of image or one frame of point cloud data may be denoted by using milliseconds.

In another embodiment, the preset condition herein may be that the data timestamp of the reference point cloud data is earlier or later than the recording timestamp of the reference image, and a difference between the data timestamp of the reference point cloud data and the recording timestamp of the reference image is less than a preset difference. For example, the data timestamp of the reference point cloud data is later than the recording timestamp of the reference image, that is, the recording timestamp of the reference image is 8:45:45, a data timestamp of point cloud data A is 8:45:46, a data timestamp of point cloud data B is 8:45:48, a data timestamp of point cloud data C is 8:45:49, and a preset difference value is 10 s. The data timestamps of the point cloud data A, the point cloud data B, and the point cloud data C are all later than the recording timestamp 8:45:45 of the reference image, and differences between data timestamps of the three pieces of point cloud data and the recording timestamp of the reference image are all less than 10 s. Therefore, all the point cloud data A, the point cloud data B, and the point cloud data C may be used as the reference point cloud data.

After the reference point cloud data is determined, in step S305, interpolation processing may be performed on the reference point cloud data to obtain the target point cloud data. As can be learned from the foregoing description, the interpolation processing is processing of estimating the target point cloud data by using known point cloud data. In one embodiment, if a timestamp range formed by data timestamps of reference point cloud data includes the recording timestamp of the reference image, the interpolation processing may be interpolative processing. A principle of the referenced interpolative processing is that: according to function values of an unknown function f(x) at several points in an interval, a specific function having function values at the several points equal to the f(x) values is obtained, to approximate an original function f(x), thereby calculating approximate values of the original function f(x) at other points in the interval by using the specific function.

In one embodiment, performing interpolation on the reference point cloud data to obtain the target point cloud data may be that: the reference point cloud data may include first point cloud data and second point cloud data, where a data timestamp of the first point cloud data is earlier than the recording timestamp of the reference image, and a data timestamp of the second point cloud data is later than the recording timestamp of the reference image. A motion function may be determined according to first information such as a location, a speed, and a direction corresponding to the first point cloud data and second information such as a location, a speed, and a direction corresponding to the second point cloud data, and then the target point cloud data is calculated according to the motion function.

Figure 4:
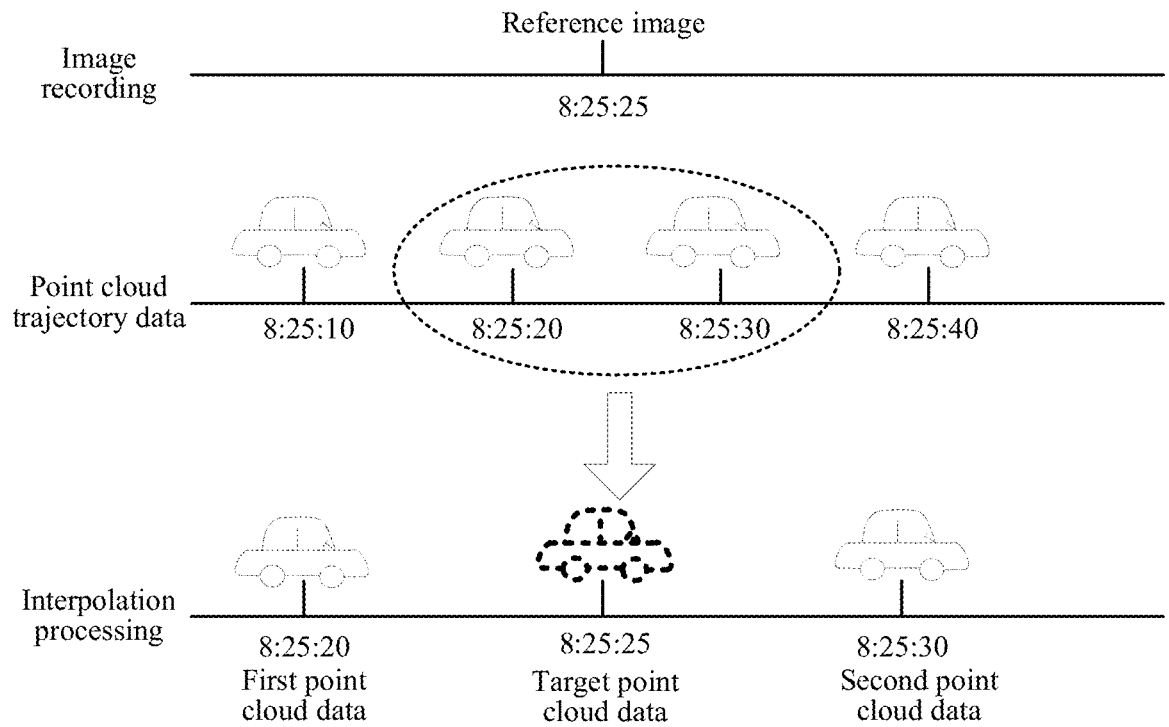
FIG. 4 is a schematic diagram of a method for determining target point cloud data according to an embodiment of this application.

For example, as shown in FIG. 4, the recording timestamp of the reference image is 8:25:25, and it is determined that the point cloud trajectory data of the target object is data that is formed by point cloud data of the target object at moments such as 8:25:10, 8:25:20, 8:25:30, and 8:25:40 and that indicates a moving trajectory of the target object. Point cloud data corresponding to two moments, 8:25:20 and 8:25:30, may be selected from the point cloud trajectory data according to the recording timestamp 8:25:25 of the reference image, and used as the reference point cloud data. That is, a timestamp of the first point cloud data and a timestamp of the second point cloud data that are included in the reference point cloud data are respectively 8:25:20 and 8:25:30.

When performing interpolative processing according to the first point cloud data and the second point cloud data to obtain the target point cloud data, information such as a first location, a first speed, and a first direction corresponding to the first point cloud data and information such as a second location, a second speed, and a second direction corresponding to the second point cloud data may be obtained. Then, the target point cloud data of which a timestamp is 8:25:25 may be estimated from the point cloud trajectory data based on the information. In an embodiment, assuming that the first speed and the second speed are the same, and moving directions are the same (that is, the first direction and the second direction are the same), in this case, it can be considered that the target object moves towards the first direction (or the second direction) at a uniform speed. Therefore, it may be determined that a motion function is a function in which time and locations are positively correlated. That is, the target point cloud data may be estimated directly according to the first location and the second location. Because a timestamp 8:25:25 of an image acquisition moment is between the timestamp 8:25:20 of the first point cloud data and the timestamp 8:25:30 of the second point cloud data, and the target object moves towards one direction (the first direction or the second direction) at a uniform speed, it may be estimated that the target point cloud data is located between the first location and the second location. Therefore, an intermediate location may be determined according to the first location and the second location, and then point cloud data corresponding to the intermediate location is determined as the target point cloud data. The target point cloud data may carry information such as a location (which, for example, may be a location opposite to the three-dimensional space sensor), a speed, and a direction, and the target point cloud data is the portion that is bolded by the black line in FIG. 4. A first difference between the data timestamp of the first point cloud data and the recording timestamp of the reference image may be equal to a second difference between the data timestamp of the second point cloud data and the recording timestamp of the reference image. In other embodiments, the first difference may alternatively be different from the second difference.

In one embodiment, if the data timestamp of the reference point cloud data is earlier than the recording timestamp of the reference image, performing interpolation on the reference point cloud data to obtain the target point cloud data may be: performing estimation backwards in time domain according to information such as a location and a speed of each piece of reference point cloud data, to obtain, through estimation, the target point cloud data corresponding to a timestamp of an image acquisition moment in the point cloud trajectory data. Similarly, if the data timestamp of the reference point cloud data is later than the recording timestamp of the reference image, estimation is performed forwards in time domain.

After the target point cloud data is determined, in step S306, matching processing may be performed between the target point cloud data and a reference enclosing box of the at least one reference object in the reference image, to determine a matching degree between the target object corresponding to the target point cloud data and the at least one reference object. In an embodiment, two-dimensional image projection may be performed on the three-dimensional space region indicated by the target point cloud data, to obtain an image projection region of the target point cloud data in the reference image, a minimum enclosing box of the image projection region is determined, and matching calculation is performed between the minimum enclosing box and the reference enclosing box of the at least one reference object in the reference image, to determine a matching degree between the target object corresponding to the target point cloud data and the at least one reference object.

In one embodiment, the intelligent terminal may first perform image detection on the reference image by using a target detection method such as a method based on a deep neural network and a method based on a DPM, to determine at least one reference object in the reference image, and a classification category and a confidence of the reference object. The confidence may be used for indicating a probability of the reference object belonging to the classification category. In addition, two-dimensional annotation may be performed on the detected reference object, to obtain a reference enclosing box of the reference object. Each reference object corresponds to one reference enclosing box, and the reference enclosing box is a two-dimensional enclosing box. The three-dimensional space region indicated by the target point cloud data may further be projected onto the reference image by using calibration parameters of the image sensor and the three-dimensional space sensor.

The calibration parameters herein may include: parameters such as an intrinsic parameter, an extrinsic parameter, and a distortion parameter of the image sensor, and an intrinsic parameter, an extrinsic parameter, and the like of the three-dimensional space sensor. After the three-dimensional space region indicated by the target point cloud data is projected onto the reference image, an image projection region of the target point cloud data in the reference image may be obtained, and the image projection region may be a region formed by projection points of the target point cloud data. Then, a minimum enclosing box may be determined according to the projection points in the image projection region, and the determined minimum enclosing box may include all the projection points or projection points, a proportion of which is greater than a preset proportion. For example, the minimum enclosing box includes 99% of the projection points. In one embodiment, when several projection points in the image projection region are relatively far away from other projection points, the minimum enclosing box may be determined according to projection points other than the several projection points in the image projection region. After the minimum enclosing box and the reference enclosing box are obtained, matching calculation may be performed between the minimum enclosing box and the reference enclosing box of the at least one reference object in the reference image, to determine the matching degree between the target object corresponding to the target point cloud data and the at least one reference object.

In one embodiment, performing the matching calculation between the minimum enclosing box and the reference enclosing box of the at least one reference object in the reference image, to determine the matching degree between the target object corresponding to the target point cloud data and the at least one reference object may be: determining the matching degree between the target object corresponding to the target point cloud data and the at least one reference object according to information such as a location and a size of the minimum enclosing box and information such as a location and a size of the reference enclosing box of the at least one reference object in the reference image. For example, the minimum enclosing box is located at the lower right corner of the reference image, and has a size of 250*200 pixels, a reference enclosing box of a reference object A is also located at the lower right corner of the reference image, and has a size of 250*200 pixels. Therefore, it may be determined that a matching degree between the target object corresponding to the target point cloud data and the reference object A is 100%. In another example, a reference enclosing box of a reference object B is located at the upper left corner of the reference image, and has a size of 250*200 pixels. Because a location of the minimum enclosing box that is located at the lower right corner is different from a location of the reference enclosing box of the reference object B, it may be determined that a matching degree between the target object corresponding to the target point cloud data and the reference object B is 0.

Figure 5:
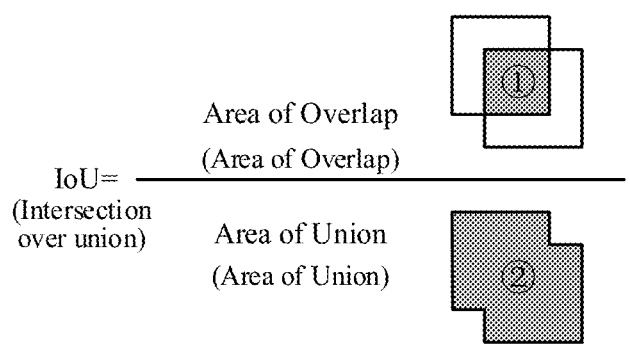
FIG. 5 is a schematic diagram of calculating an intersection over union (IoU) according to an embodiment of this application.

In another embodiment, to calculate a matching degree between the target object and a reference object more accurately, performing the matching calculation between the minimum enclosing box and the reference enclosing box of the at least one reference object in the reference image, to determine the matching degree between the target object corresponding to the target point cloud data and the at least one reference object may be: calculating an IoU between the minimum enclosing box and the reference enclosing box of the at least one reference object in the reference image; and using the IoU as the matching degree between the target object corresponding to the target point cloud data and the at least one reference object. For example, an IoU between the minimum enclosing box and each reference enclosing box may be calculated by using the method shown in FIG. 5. The referenced IoU is a standard for measuring accuracy that is of a corresponding object and that is detected in a specific dataset, and may be used for measuring a correlation between an actual value and a predicted value, and a higher correlation indicates a larger value of the IoU. In the embodiments of this application, a ratio of an area of an overlap between the minimum enclosing box and a reference enclosing box (such as an area of a shadow portion with a sequence number ① in FIG. 5) to an area of a union between the minimum enclosing box and the reference enclosing box (such as an area of a shadow portion with a sequence number ② in FIG. 5) may be determined as an IoU, and the IoU is used as the matching degree between the target object and the reference object. A larger value of the IoU indicates a higher matching degree between the target object and the reference object. A value that is of an IoU and that is obtained after calculation is performed according to a percentage may be used as a matching degree. For example, if IoU=8/10=0.8, a matching degree may be quantized by using 80%.

Because the matching degree may indicate a fitting degree between the target object and the reference object, after a matching degree between the target object and each reference object is determined, in step S307, a target reference object may be determined from the at least one reference object according to the matching degree, a matching degree between the target reference object and the target object corresponding to the target point cloud data being greater than a preset threshold. The preset threshold herein may be determined according to service requirements or empirical values. Specifically, each matching degree may be compared with the preset threshold. If a matching degree is greater than the preset threshold (such as 80%), it may indicate that a fitting degree between a reference object corresponding to the matching degree and the target object is high. In this case, the reference object corresponding to the matching degree may be determined as the target reference object. When there may be a plurality of reference enclosing boxes having matching degrees with the minimum enclosing box greater than the preset threshold, a reference object corresponding to a reference enclosing box with the largest IoU as the target reference object.

In one embodiment, to further determine the target reference object more accurately and ensure uniqueness of the target reference object, the target reference object may further be determined according to a classification category of the target reference object and a classification category of the reference object. Specifically, a candidate reference object may be first determined from the at least one reference object according to the matching degree, a matching degree between the candidate reference object and the target object corresponding to the target point cloud data being greater than the preset threshold, and then the target reference object is determined according to a classification category of the candidate reference object and a classification category of the target object corresponding to the target point cloud data. A classification category of the target reference object may be the same as the classification category of the target object corresponding to the target point cloud data. For example, both classification categories of the target reference object and the target object are bicycle. In other embodiments, the classification category of the target reference object may be similar to the classification category of the target object. For example, the classification category of the candidate reference object is off-road vehicle, and the classification category of the target object is multi-purpose vehicle. Because both a shape and a size of an off-road vehicle are similar to those of a multi-purpose vehicle, in this case, the candidate reference object may be determined as the target reference object.

After the target reference object is determined, in step S308, object information of the target reference object may be obtained. The object information of the target reference object herein may include a two-dimensional annotation size of the target reference object and/or a classification category of the target reference object. The two-dimensional annotation size is a size of a reference enclosing box that encloses the target reference object. Then, in step S309, a projection size of the three-dimensional space region corresponding to the target point cloud data and that is projected onto the reference image may be determined according to the object information. The projection size herein may be a size of a three-dimensional enclosing box. That is, the projection size may include a height value, a length value, and/or a width value of the three-dimensional enclosing box. When the projection size is determined, a height value in the projection size may be determined according to the two-dimensional annotation size of the target reference object, and a length value and/or a width value in the projection size are/is determined according to the classification category of the target reference object.

In one embodiment, in a case that the object information includes a two-dimensional annotation size of the target reference object, determining, according to the object information, the projection size of the three-dimensional space region corresponding to the target point cloud data and that is projected onto the reference image may be: obtaining a height value of the two-dimensional annotation size; and determining, according to the height value, the height value in the projection size of the three-dimensional space region corresponding to the target point cloud data and that is projected onto the reference image. That is, after the height value of the two-dimensional annotation size is obtained, the height value of the two-dimensional annotation size may be determined as the height value in the projection size.

In another embodiment, in a case that the object information includes: a classification category of the target reference object, determining, according to the object information, the projection size of the three-dimensional space region corresponding to the target point cloud data and that is projected onto the reference image may be: first obtaining a standard size value set for the classification category. The standard size value herein is a value of an actual size corresponding to the classification category, and may include: a standard length value and/or a standard width value. For example, a classification category is car, and an actual length of a car is 4 meters. Therefore, a standard length value set for the classification category is 4 meters. Then, a length value and/or a width value in the projection size of the three-dimensional space region corresponding to the target point cloud data and that is projected onto the reference image may be determined according to the standard size value.

In a case that the standard size value includes the standard length value, determining, according to the standard size value, the length value in the projection size of the three-dimensional space region corresponding to the target point cloud data and that is projected onto the reference image may be: adjusting a length value of the three-dimensional space region to the standard length value in a case that a difference between the length value of the three-dimensional space region and the standard length value is greater than a preset length difference, and determining the length value in the projection size according to an adjusted length value of the three-dimensional space region. When the length value in the projection size is determined according to the adjusted length value of the three-dimensional space region, the length value in the projection size corresponding to the adjusted length value of the three-dimensional space region may be determined according to a projection proportional relationship between an actual size and the projection size of the three-dimensional space region. For example, the target reference object is classified into a car. Generally, a length of a car is within 5 meters. Therefore, after the classification category of the target reference object is determined, a length value of the three-dimensional space region is adjusted from initial 2 meters to 5 meters, so that an adjusted length value of the three-dimensional space region is 5 meters. A projection proportional relationship is 1:50, and then the determined length value in the projection size is equal to 250 pixels.

In a case that the standard size value includes the standard width value, determining, according to the standard size value, the width value in the projection size of the three-dimensional space region corresponding to the target point cloud data and that is projected onto the reference image may be: adjusting a width value of the three-dimensional space region to the standard width value in a case that a difference between the width value of the three-dimensional space region and the standard width value is greater than a preset width difference, and determining the width value in the projection size according to an adjusted width value of the three-dimensional space region. When the width value in the projection size is determined according to the adjusted width value of the three-dimensional space region, the width value in the projection size corresponding to the adjusted width value of the three-dimensional space region may alternatively be determined according to a projection proportional relationship. For example, the target reference object is classified into a car. Generally, a width of a car is within 2 meters. Therefore, after the classification category of the target reference object is determined, a width value of the three-dimensional space region may be adjusted from initial 0.5 meters to 2 meters, so that an adjusted width value of the three-dimensional space region is 2 meters. A projection proportional relationship is 1:50, and then the determined width value in the projection size is equal to 100 pixels.

The preset length difference and the preset width difference herein may be determined according to service requirements or empirical values. Both the preset length difference and the preset width difference may be relatively large values, for example, 2 meters. In this case, if the length value of the three-dimensional space region is far less than the standard length value, and/or the width value of the three-dimensional space region is far less than the standard width value, the length value and/or the width value of the three-dimensional space region are/is adjusted. Both the preset length difference and the preset width difference may alternatively be relatively small values, for example, 0. In this case, if the length value of the three-dimensional space region is not equal to the standard length value, and/or the width value of the three-dimensional space region is not equal to the standard width value, the length value and/or the width value of the three-dimensional space region are/is adjusted.

After the projection size is determined, in step S310, three-dimensional annotation may be performed on the target reference object in the reference image according to the determined projection size. Then, a location of the target reference object in a three-dimensional space may be determined according to the three-dimensional annotation.

When three-dimensional annotation is performed on an object in the embodiments of this application, target point cloud data of a target object may be obtained, a projection size of a three-dimensional space region corresponding to the target point cloud data and that is projected onto a reference image is determined, and then three-dimensional annotation is performed on a target reference object, in the reference image, matching the target object according to the projection size, to accurately determine a location of the target reference object, in a two-dimensional image, in a three-dimensional space. By performing three-dimensional annotation on the target reference object in the reference image according to the target point cloud data, the annotation accuracy may be improved, an actual location of the target reference object may be accurately determined, and annotation does not need to be performed manually, which can improve the annotation efficiency, and reduce the cost of annotation.

Figure 6A:
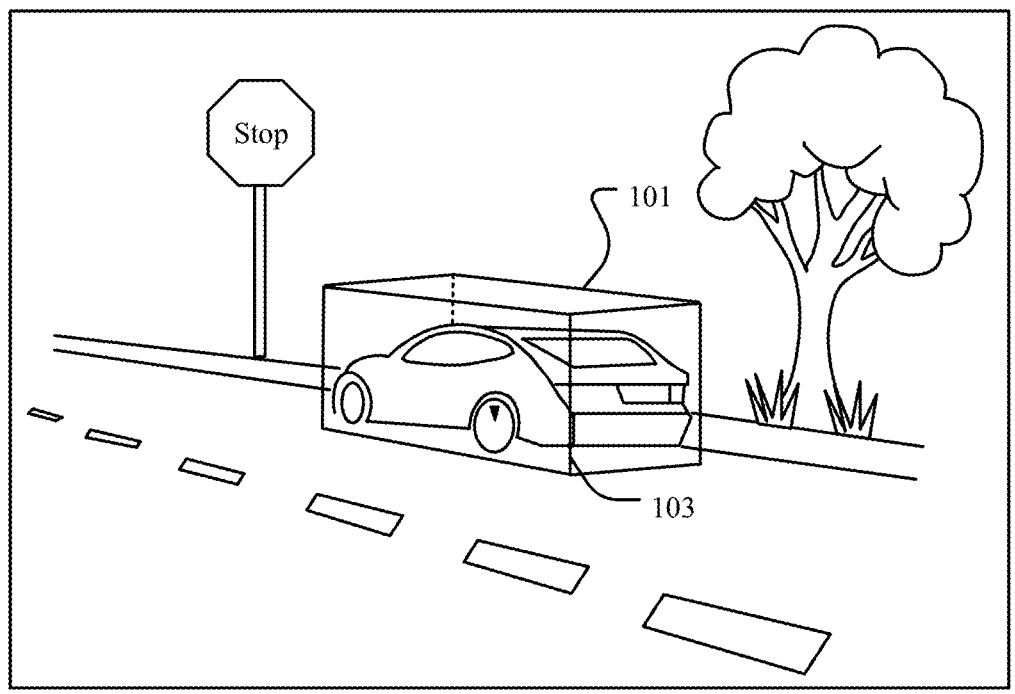
FIG. 6A is an effect diagram of performing three-dimensional annotation in a two-dimensional image according to an embodiment of this application.
Figure 6B:
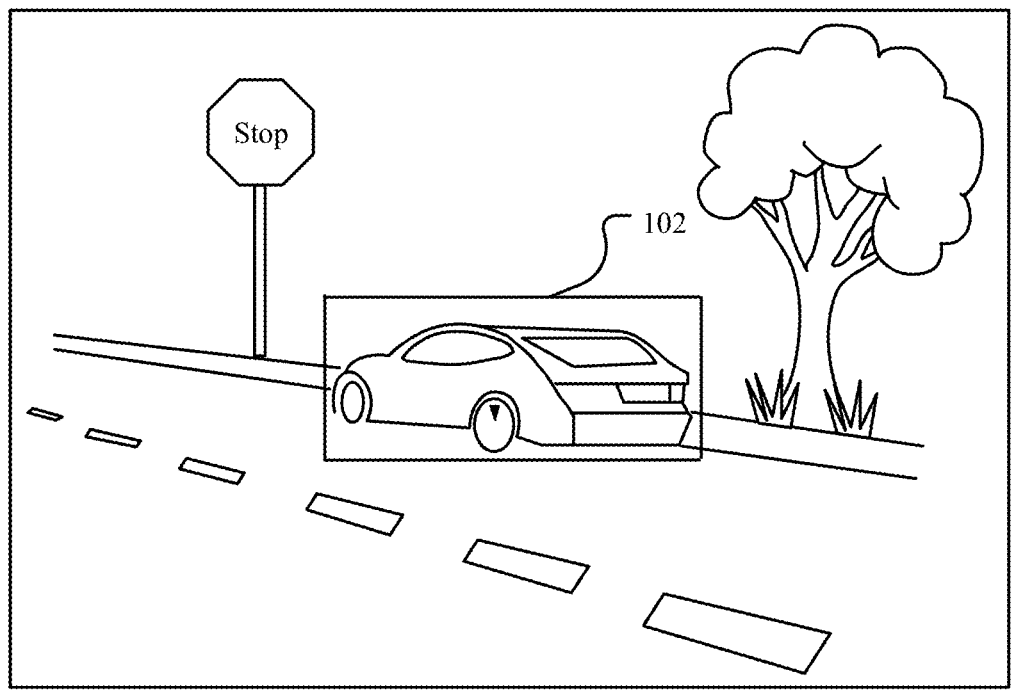
FIG. 6B is an effect diagram of performing two-dimensional annotation in a two-dimensional image according to an embodiment of this application.

Based on the foregoing description, in the embodiments of this application, three-dimensional annotation may be implemented on a planar two-dimensional image, and an object in the two-dimensional image is annotated in a form of a three-dimensional box. In this way, in a moving process of a mobile platform such as an autonomous vehicle, a robot, and a UAV, a location of an object in the two-dimensional image can be more accurately determined based on annotation of the three-dimensional box, thereby facilitating in performing movement control such as obstacle avoidance and tracking on the mobile platform. As shown in FIG. 6A, a three-dimensional annotation box 101 can be obtained by performing three-dimensional annotation on a target vehicle in a two-dimensional image. As shown in FIG. 6B, a two-dimensional annotation box 102 can be obtained by performing two-dimensional annotation on the vehicle in the two-dimensional image. A vehicle (for example, an autonomous vehicle) recording the image can determine, in the three-dimensional annotation box 101, that a portion nearest to this vehicle is a portion that is annotated by a ridge line 103 in the rear of the target vehicle, but a rear portion of the target vehicle cannot be detected and determined in the two-dimensional annotation box 102 corresponding to FIG. 6B.

In an embodiment, to implement three-dimensional annotation on the planar two-dimensional image to enable movement control such as obstacle avoidance and tracking to be performed on the mobile platform according to a three-dimensional annotation region, a model used for performing three-dimensional annotation on a two-dimensional image may be established, and three-dimensional annotation is performed, based on the model, on a two-dimensional image recorded by a device such as a camera. Then, a location of a target object may be more accurately determined through the two-dimensional image by using a mature detection and recognition technology of the two-dimensional image, thereby facilitating in performing movement control such as obstacle avoidance and tracking on the mobile platform. In a process of establishing the model, an initial model may be trained under supervision based on a large quantity of sample images, so that a model that can more accurately perform three-dimensional annotation on a two-dimensional image may be obtained. For an annotation process of a sample image, which is a planar image, reference may be made to related content of performing three-dimensional annotation on the reference image in the foregoing embodiment.

In an embodiment, a user may first manually select a three-dimensional annotation box in a sample image, and perform manual annotation on the two-dimensional sample image, to obtain a three-dimensional annotated sample image. Then, the original sample image is inputted in an initial model, and the initial model performs recognition and three-dimensional annotation on the original sample image. If a three-dimensional annotation region is the same as an annotation region in the foregoing three-dimensional annotated sample image, it proves that the initial model is available, and the initial model does not need to be optimized. If the three-dimensional annotation region is different from the annotation region in the foregoing three-dimensional annotated sample image, the initial model needs to be optimized until the three-dimensional annotation region in the original sample image that is annotated by the initial model is the same as the annotation region in the foregoing three-dimensional annotated sample image. Same processing is performed on the large quantity of sample images based on the initial model, to complete the optimization of the initial model, and a final model that is finally obtained may be disposed in a mobile platform such as an autonomous vehicle, a UAV, or a robot.

In an embodiment, the sample images may be automatically annotated. Three-dimensional point cloud data of an object is obtained by a three-dimensional space sensor by scanning an environment space, and three-dimensional annotation is performed, based on the three-dimensional point cloud data, on a reference image obtained through recording in the environment space. For a process of performing three-dimensional annotation based on the three-dimensional point cloud data of the three-dimensional space sensor, reference may be made to the foregoing object annotation method shown in FIG. 2 or FIG. 3. Details are not described herein. Obtained three-dimensional annotated sample images may be used for training and optimizing the initial model based on the foregoing same principle. The three-dimensional point cloud data may be used for performing automatic three-dimensional annotation on the sample images instead of performing manual three-dimensional annotation, and the final model that is finally obtained through training may directly perform three-dimensional annotation on an image recorded by a camera apparatus. In other embodiments, the model obtained through training may alternatively complete, based on three-dimensional point cloud data, three-dimensional annotation on an image recorded by the camera apparatus in a moving processing of the mobile platform. In other embodiments, after the three-dimensional annotated sample images are obtained, the three-dimensional annotated sample images may be directly outputted to an annotation person, so that the annotation person detects whether annotation effects of the three-dimensional annotated sample images are qualified.

After the final model is obtained through training, the final model may be used in a mobile platform. The mobile platform may include: an autonomous vehicle (or referred to as a self-piloting automobile), a UAV (or referred to as a drone), or a robot. The autonomous vehicle herein may also be referred to as a driverless car, a computer-driven car, or a wheeled mobile robot, and is an intelligent car that realizes unmanned driving through a computer system. The autonomous vehicle may rely on coordination among an artificial intelligence system, a visual computation system, a radar system, a monitoring apparatus system, and a global positioning system, so that a computer can automatically and safely operate the autonomous vehicle without an active operation of a person.

In one embodiment, all the mobile platforms may be provided with a three-dimensional space sensor (for example, a laser radar or a three-dimensional laser scanner) and an image sensor (for example, a camera apparatus). The referenced laser radar is a radar system that detects features such as a location and a speed of a target object by emitting a laser beam. An example in which the three-dimensional space sensor is a laser radar, and the image sensor is a camera apparatus is used. In an automatic moving process, the mobile platforms may obtain laser point cloud data of a target object (a to-be-annotated object) around the mobile platforms by using the laser radar, where the laser point cloud data may indicate a three-dimensional space region occupied by the target object in the environment space; obtain a reference image of an environment around the mobile platform by using the camera apparatus, where the reference image may include an image region of the target object that is detected by the laser radar. The target object herein is an object that affects secured movement of the mobile platform or a tracked object of the mobile platform, for example, a pedestrian, a vehicle, or a bicycle. In an embodiment, the mobile platform may be connected to an intelligent terminal, receive a control instruction sent by the intelligent terminal, and perform secure movement according to the control instruction. After obtaining data such as the laser point cloud data of the target object and the reference image, the mobile platform may send the data to the intelligent terminal, and the intelligent terminal calls the final model that is trained and optimized to perform a series of object annotation processing according to the data. Then, a control instruction is generated according to an annotation result, to control the mobile platform to avoid the target object in a moving process, and move securely.

Figure 7:
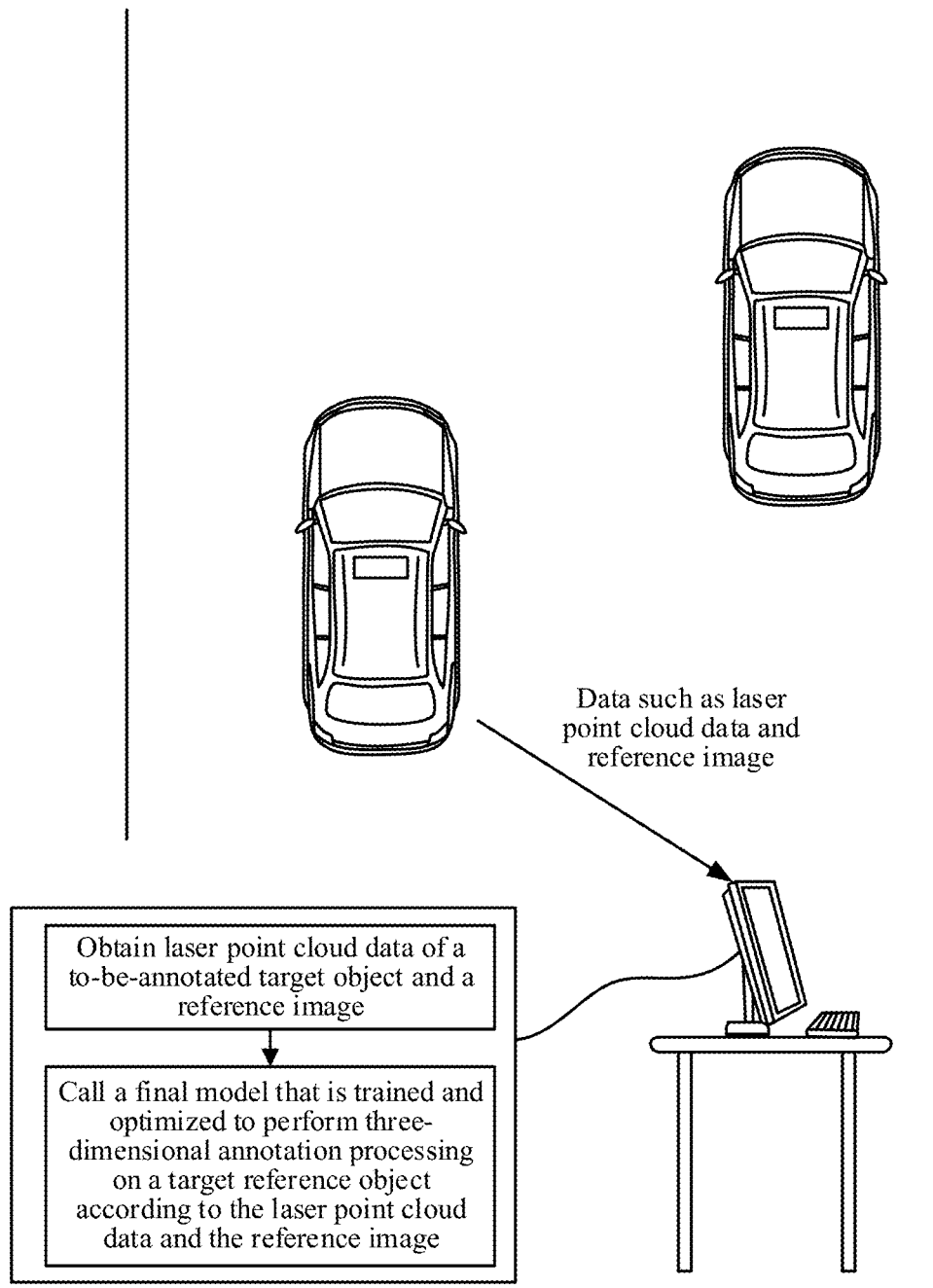
FIG. 7 is an application scenario diagram of an object annotation method according to an embodiment of this application.

Using an example in which the mobile platform is a driverless car, the driverless car may be connected to a control device, for example, an intelligent terminal (such as a dedicated computer device), as shown in FIG. 7. The computer device may be a part of the driverless car, and is disposed on the driverless car, or may be an external independent computer device. During an automatic traveling process of the driverless car, laser point cloud data (or referred to as target point cloud data) of a to-be-annotated target object around the driverless car may be obtained by using a laser radar, and simultaneously, a reference image that is recorded by a camera apparatus from an environment space in the traveling process of the driverless car is obtained. The target object may be a vehicle, a pedestrian, or the like other than the driverless car on the road. After obtaining the laser point cloud data of the to-be-annotated target object and the reference image, the driverless car may send the laser point cloud data of the to-be-annotated target object and the reference image to the intelligent terminal connected to the driverless car.

Figure 8:
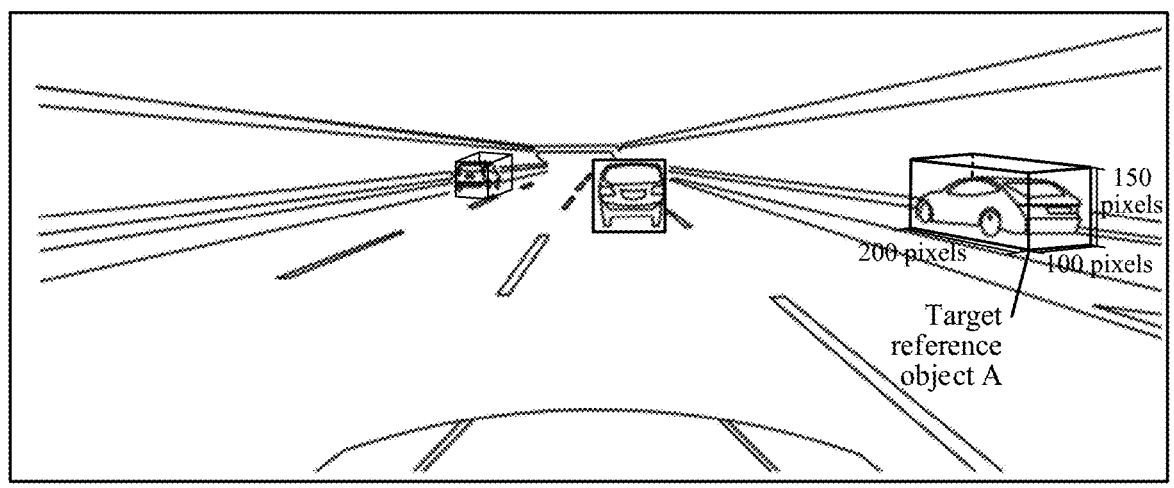
FIG. 8 is an annotation effect diagram of an object annotation method according to an embodiment of this application.

After obtaining the laser point cloud data of the to-be-annotated target object and the reference image, the intelligent terminal may call the trained and optimized final model to perform three-dimensional annotation processing on a target reference object according to the laser point cloud data and the reference image. The target reference object herein is a target object corresponding to the to-be-annotated target object in the reference image. In an embodiment, a target reference object matching the to-be-annotated target object may be determined from the reference image, a projection size of a three-dimensional space region corresponding to the laser point cloud data and that is projected onto the reference image is determined, and then three-dimensional annotation is performed on the target reference object in the reference image according to the determined projection size. For example, using a target reference object A as an example, a length value of a determined projection size is 200 pixels, a width value is 100 pixels, and a height value is 150 pixels. Therefore, an annotation effect diagram shown in FIG. 8 may be obtained by performing three-dimensional annotation on the target reference object A by using the determined projection size. The intelligent terminal may further send the annotation effect diagram to the driverless car, so that the driverless car may display the annotation effect diagram in a display screen.

In the embodiments of this application, during the automatic traveling process of the driverless car, after the laser point cloud data of the to-be-annotated target object and the reference image are obtained, a series of processing such as projection and matching may be performed according to the laser point cloud data and the reference image, thereby implementing annotation processing on the target reference object in the reference image, and obtaining a 3D enclosing box of the target reference object. By performing three-dimensional annotation on the target reference object in the reference image according to the laser point cloud data of the to-be-annotated target object, the annotation accuracy may be improved, so as to accurately determine a location of the target reference object, in a two-dimensional image, in a three-dimensional space. In addition, during the annotation process, the laser point cloud data does not need to be manually annotated by a large quantity of annotation persons, which can simplify the annotation operation, improve the annotation efficiency, and reduce the cost of annotation.

In one embodiment, a processor may be disposed in the mobile platform, and the processor is connected to the three-dimensional space sensor and the camera apparatus. After the mobile platform obtains data such as the laser point cloud data of the to-be-annotated target object and the reference image, the processor in the mobile platform may alternatively perform a series of data processing such as three-dimensional annotation and image-based target object recognition according to the data. A control instruction is generated according to a data processing result, and automatic traveling is performed according to the control instruction, so as to avoid the target object in the traveling process, thereby achieving safe traveling.

Figure 9:
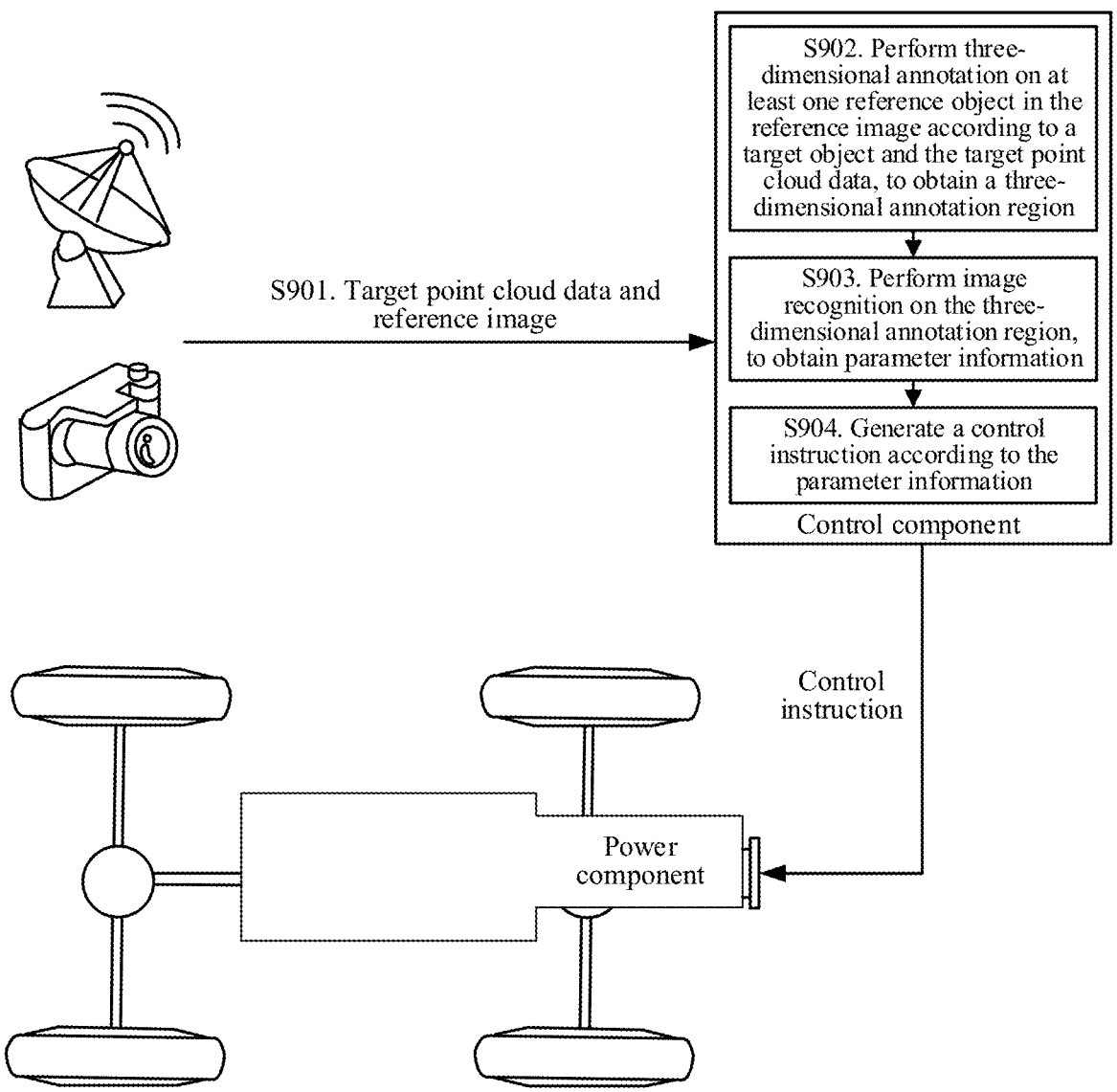
FIG. 9 is a schematic flowchart of a movement control method according to an embodiment of this application.

In another embodiment, to implement three-dimensional annotation on the planar two-dimensional image to enable movement control such as obstacle avoidance and tracking to be performed on the mobile platform according to a three-dimensional annotation region, the embodiments of this application may follow the process outlined in the schematic flowchart of a movement control method shown in FIG. 9. The movement control method provided in the embodiments of this application may be implemented by using a control device. The control device herein may be an intelligent terminal, for example, a mobile intelligent terminal such as a smartphone or a tablet computer, or a desktop computer. The control device may alternatively be some mobile platforms automatically moving based on image recognition. The mobile platforms herein may include: a driverless car, a robot, and a UAV. The mobile platforms may be provided with a processor, a three-dimensional space sensor, and an image sensor.

In the embodiments of this application, an example in which the control device is a mobile platform to implement the movement control method is used. In step S901, in a moving process of the mobile platform, a reference image that is recorded from an environment space is obtained, and target point cloud data is obtained by scanning the environment space, the target point cloud data indicating a three-dimensional space region occupied by a target object in the environment space. Specifically, because the mobile platform is provided with the three-dimensional space sensor and the image sensor, in a moving process of the mobile platform, the image sensor may be called to perform real-time recording on a target object (such as a vehicle or a pedestrian) in an environment space, an image obtained through real-time recording is used as a reference image, and the obtained reference image may include at least one reference object. Simultaneously, the mobile platform may further call the three-dimensional space sensor to perform real-time scanning on the target object in the environment space, and use point cloud data obtained through real-time scanning as target point cloud data.

Because acquisition frequencies of images and point cloud data are different, acquired frame images and point cloud data frames may not be in a one-to-one correspondence. Thus, the mobile platform may not obtain the target point cloud data obtained through scanning when obtaining the reference image. Therefore, the mobile platform may set a delay time to obtain more point cloud data, thereby determining the target point cloud data. For example, an acquisition frequency of an image is 20 frames/second, and an acquisition frequency of point cloud data is 15 frames/second. If image acquisition and point cloud data acquisition are performed at the same moment, 20 frames of images and 15 point cloud data frames may be acquired within one second. If an acquired $20^{th}$ frame of image is used as the reference image, and in this case, there is no corresponding target point cloud data, a delay time such as 1 second may be set. Therefore, the mobile platform may further obtain 15 point cloud data frames, so that the target point cloud data corresponding to the reference image may be found and determined based on the obtained 30 point cloud data frames.

Therefore, in one embodiment, obtaining the target point cloud data obtained by scanning the environment space may include the following step s11 to step s14:

Step s11. Obtain a point cloud data frame set obtained by scanning the environment space, where the point cloud data frame set may include a plurality of point cloud data frames acquired at an image acquisition moment and a plurality of point cloud data frames acquired within a delay time set by the mobile platform.

Step s12. Track the target object based on the point cloud data frame set, to determine point cloud trajectory data of the target object.

Specifically, the point cloud data frame set may include at least two point cloud data frames. Object detection may be performed on a target point cloud data frame, to determine the target object, the target point cloud data frame being any point cloud data frame in the point cloud data frame set.

An associated point cloud data frame associated with the target point cloud data frame is obtained, and the associated point cloud data frame includes one point cloud data frame having an acquisition time earlier or later than that of the target point cloud data frame. Tracking processing is performed on the target object based on the associated point cloud data frame, to determine the point cloud trajectory data of the target object.

Step s13. Determine reference point cloud data from the point cloud trajectory data according to a recording timestamp of the reference image, where a data timestamp of the reference point cloud data and the recording timestamp of the reference image meet a preset condition.

In one embodiment, the preset condition herein may be that a timestamp range formed by data timestamps of reference point cloud data includes the recording timestamp of the reference image, and differences between the data timestamps and the recording timestamp are less than a preset difference. In another embodiment, the preset condition herein may be that the data timestamp of the reference point cloud data is earlier or later than the recording timestamp of the reference image, and a difference between the data timestamp of the reference point cloud data and the recording timestamp of the reference image is less than a preset difference.

Step s14. Perform interpolation processing on the reference point cloud data to obtain the target point cloud data.

The interpolation processing is processing of estimating the target point cloud data by using known point cloud data. In one embodiment, if a timestamp range formed by data timestamps of reference point cloud data includes the recording timestamp of the reference image, the interpolation processing may be interpolative processing. Correspondingly, performing interpolation on the reference point cloud data to obtain the target point cloud data may be that: the reference point cloud data may include first point cloud data and second point cloud data, where a data timestamp of the first point cloud data is earlier than the recording timestamp of the reference image, and a data timestamp of the second point cloud data is later than the recording timestamp of the reference image. A motion function may be determined according to first information such as a location, a speed, and a direction corresponding to the first point cloud data and second information such as a location, a speed, and a direction corresponding to the second point cloud data, and then the target point cloud data is calculated according to the motion function.

In one embodiment, if the data timestamp of the reference point cloud data is earlier than the recording timestamp of the reference image, performing interpolation on the reference point cloud data to obtain the target point cloud data may be: performing estimation backwards in time domain according to information such as a location and a speed of each piece of reference point cloud data, to obtain, through estimation, the target point cloud data corresponding to a timestamp of an image acquisition moment in the point cloud trajectory data. Similarly, if the data timestamp of the reference point cloud data is later than the recording timestamp of the reference image, estimation is performed forwards in time domain.

After obtaining the reference image and the target point cloud data, in step S902, the mobile platform may perform three-dimensional annotation on at least one reference object in the reference image according to the target object and the target point cloud data, to obtain a three-dimensional annotation region. In one embodiment, step S902 may include the following step s21 to step s23:

Step s21. Determine a target reference object matching the target object from the at least one reference object in the reference image. The target reference object herein may be considered as an object corresponding to the target object in the reference image.

In one embodiment, when determining the target reference object matching the target object from the at least one reference object in the reference image, the mobile platform may first perform matching processing between the target point cloud data and a reference enclosing box of the at least one reference object in the reference image, to determine a matching degree between the target object corresponding to the target point cloud data and the at least one reference object. In one embodiment, in a process in which the mobile platform determines the matching degree, the mobile platform may perform two-dimensional image projection on the three-dimensional space region indicated by the target point cloud data, to obtain an image projection region of the target point cloud data in the reference image; determine a minimum enclosing box of the image projection region; and perform matching calculation between the minimum enclosing box and the reference enclosing box of the at least one reference object in the reference image, to determine a matching degree between the target object corresponding to the target point cloud data and the at least one reference object.

In one embodiment, performing the matching calculation between the minimum enclosing box and the reference enclosing box of the at least one reference object in the reference image, to determine the matching degree between the target object corresponding to the target point cloud data and the at least one reference object may be: calculating an IoU between the minimum enclosing box and the reference enclosing box of the at least one reference object in the reference image; and using the IoU as the matching degree between the target object corresponding to the target point cloud data and the at least one reference object.

In another embodiment, performing the matching calculation between the minimum enclosing box and the reference enclosing box of the at least one reference object in the reference image, to determine the matching degree between the target object corresponding to the target point cloud data and the at least one reference object may be: determining the matching degree between the target object corresponding to the target point cloud data and the at least one reference object according to information such as a location and a size of the minimum enclosing box and information such as a location and a size of the reference enclosing box of the at least one reference object in the reference image.

After the matching degree between the target object and the at least one reference object is determined, a target reference object may be determined from the at least one reference object according to the matching degree, a matching degree between the target reference object and the target object corresponding to the target point cloud data being greater than a preset threshold. The preset threshold herein may be determined according to service requirements or empirical values. In one embodiment, determining the target reference object from the at least one reference object according to the matching degree may be: comparing each matching degree with the preset threshold, and if a matching degree is greater than the preset threshold (such as 80%), a reference object corresponding to the matching degree may be determined as the target reference object. When there may be a plurality of reference enclosing boxes having matching degrees with the minimum enclosing box greater than the preset threshold, a reference object corresponding to a reference enclosing box with the highest matching degree as the target reference object.

In one embodiment, to further determine the target reference object more accurately and ensure uniqueness of the target reference object, the target reference object may further be determined according to a classification category of the target reference object and a classification category of the reference object. Specifically, a candidate reference object may be first determined from the at least one reference object according to the matching degree, a matching degree between the candidate reference object and the target object corresponding to the target point cloud data being greater than the preset threshold, and then the target reference object is determined according to a classification category of the candidate reference object and a classification category of the target object corresponding to the target point cloud data.

Step s22. Determine a projection size of the three-dimensional space region corresponding to the target point cloud data and that is projected onto the reference image.

After the target reference object is determined, object information of the target reference object may be obtained. The object information of the target reference object may include a two-dimensional annotation size of the target reference object and/or a classification category of the target reference object. The two-dimensional annotation size is a size of a reference enclosing box that encloses the target reference object. Then, a projection size of the three-dimensional space region corresponding to the target point cloud data and that is projected onto the reference image may be determined according to the object information. The projection size may include a height value, a length value, and/or a width value of a three-dimensional enclosing box. When the projection size is determined, a height value in the projection size may be determined according to the two-dimensional annotation size of the target reference object, and a length value and/or a width value in the projection size are/is determined according to the classification category of the target reference object.

In one embodiment, in a case that the object information includes a two-dimensional annotation size of the target reference object, determining, according to the object information, the projection size of the three-dimensional space region corresponding to the target point cloud data and that is projected onto the reference image may be: obtaining a height value of the two-dimensional annotation size; and determining, according to the height value, the height value in the projection size of the three-dimensional space region corresponding to the target point cloud data and that is projected onto the reference image. That is, after the height value of the two-dimensional annotation size is obtained, the height value of the two-dimensional annotation size may be determined as the height value in the projection size. In another embodiment, in a case that the object information includes: a classification category of the target reference object, determining, according to the object information, the projection size of the three-dimensional space region corresponding to the target point cloud data and that is projected onto the reference image may be: first obtaining a standard size value set for the classification category. The standard size value herein is a value of an actual size corresponding to the classification category, and may include: a standard length value and/or a standard width value. Then, a length value and/or a width value in the projection size of the three-dimensional space region corresponding to the target point cloud data and that is projected onto the reference image may be determined according to the standard size value.

If the standard size value includes the standard length value, a specific implementation of determining, according to the standard size value, the length value in the projection size of the three-dimensional space region corresponding to the target point cloud data and that is projected onto the reference image may be: adjusting a length value of the three-dimensional space region to the standard length value if a difference between the length value of the three-dimensional space region and the standard length value is greater than a preset length difference, and determining the length value in the projection size according to an adjusted length value of the three-dimensional space region. When the length value in the projection size is determined according to the adjusted length value of the three-dimensional space region, the length value in the projection size corresponding to the adjusted length value of the three-dimensional space region may be determined according to a projection proportional relationship between an actual size and the projection size of the three-dimensional space region.

If the standard size value includes the standard width value, a specific implementation of determining, according to the standard size value, the width value in the projection size of the three-dimensional space region corresponding to the target point cloud data and that is projected onto the reference image may be: adjusting a width value of the three-dimensional space region to the standard width value if a difference between the width value of the three-dimensional space region and the standard width value is greater than a preset width difference, and determining the width value in the projection size according to an adjusted width value of the three-dimensional space region. When the width value in the projection size is determined according to the adjusted width value of the three-dimensional space region, the width value in the projection size corresponding to the adjusted width value of the three-dimensional space region may alternatively be determined according to a projection proportional relationship.

Step s23. Perform three-dimensional annotation on the target reference object in the reference image according to the determined projection size, to obtain a three-dimensional annotation region.

After the projection size is determined, the mobile platform may perform three-dimensional annotation on the target reference object in the reference image according to the determined projection size, to obtain a three-dimensional annotation region.

After the three-dimensional annotation region is obtained, in step S903, image recognition may be performed on the three-dimensional annotation region in the reference image, to determine parameter information of the target reference object in the three-dimensional annotation region. In an embodiment, the parameter information of the target reference object herein may include a length value, a width value, and a height value of the target reference object, location information of the target reference object, and information about a distance between the target reference object and the mobile platform.

After the parameter information of the target reference object is determined, in step S904, a control instruction may be generated according to the parameter information, and the mobile platform is controlled, according to the control instruction, to move. The control instruction herein may include: a speed control instruction and/or a direction control instruction. In one embodiment, the mobile platform may generate a speed control instruction according to the information about the distance between the target reference object and the mobile platform and the location information of the target reference object. If the location information indicates that the target reference object is located right in front of the mobile platform, and the distance information indicates that the distance between the target reference object and the mobile platform is relatively long, the generated speed control instruction may control the mobile platform to keep the current speed and continue to travel, or may control the mobile platform to travel at a speed higher than the current speed, and the increased speed is lower than the highest speed allowed on the current road. If the location information indicates that the target reference object is located right in front of the mobile platform, and the distance information indicates that the distance between the target reference object and the mobile platform is relatively short, the generated speed control instruction may control the mobile platform to travel at a speed lower than the current speed, to avoid collision between the mobile platform and the target reference object that is located right in front of the mobile platform.

The mobile platform may further generate a direction control instruction according to the length value, the width value, and the height value of the target reference object, the location information of the target reference object, and the information about the distance between the target reference object and the mobile platform. Specifically, direction changing performed by the mobile platform towards a direction may be determined according to the location information of the target reference object, and an angle of the direction changing is determined according to length value, the width value, and the height value of the target reference object and the information about the distance between the target reference object and the mobile platform.

Figure 10:
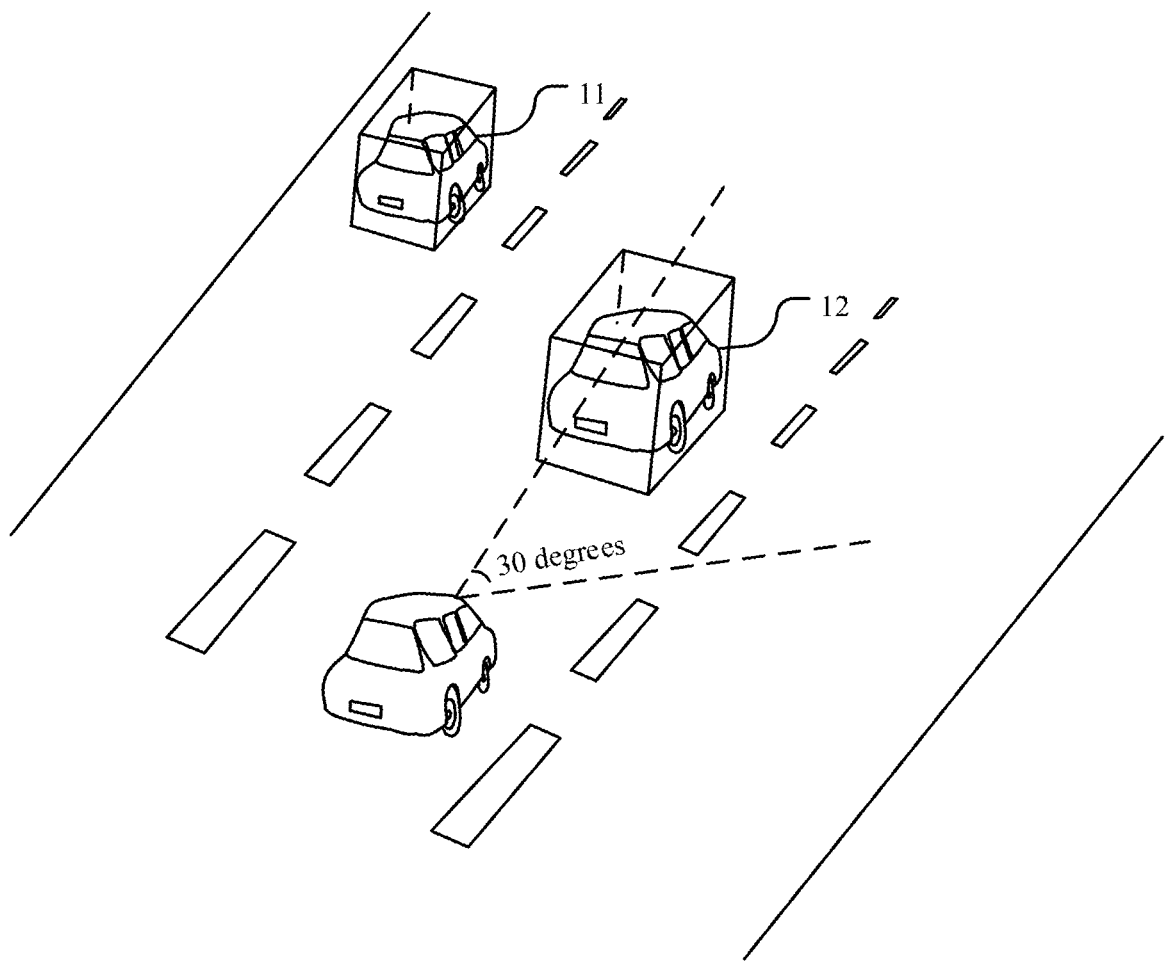
FIG. 10 is an application scenario diagram of a movement control method according to an embodiment of this application.

For example, as shown in FIG. 10, the reference image includes two target reference objects and three-dimensional enclosing boxes of the two target reference objects. Parameter information of the two target reference objects may be respectively obtained by performing image recognition respectively on the three-dimensional enclosing boxes of the two target reference objects. Location information of the target reference object 11 indicates that the target reference object 11 is located right in front of the mobile platform, and location information of the target reference object 12 indicates that the target reference object 12 is located in the left front of the mobile platform. When performing lane changing, the mobile platform may determine, according to location information of the target reference object 11 and the target reference object 12, that the mobile platform performs lane changing to the right, that is, a traveling direction is changed from a current traveling direction to a direction of traveling to the right front to complete the lane changing. In addition, it may be determined that an angle of the direction changing is 30 degrees according to a length value, a width value, and a height value of the target reference object 11, information about a distance between the target reference object 11 and the mobile platform, a length value, a width value, and a height value of a three-dimensional enclosing box of the target reference object 12, and information about a distance between the target reference object 12 and the mobile platform. That is, the direction control instruction may control the mobile platform to travel to the right front at a 30-degree angle based on the current traveling direction.

In the embodiments of this application, during the automatic moving process of the mobile platform, after the laser point cloud data of the target object and the reference image are obtained, three-dimensional annotation may be performed on the target reference object in the reference image according to the target point cloud data of the target object, thereby improving the accuracy of the three-dimensional annotation region obtained through three-dimensional annotation. After the three-dimensional annotation region is obtained, image recognition may be performed on the three-dimensional annotation region to obtain the parameter information, to more accurately determine a location of the target object, so that the control instruction is generated according to the parameter information to perform movement control such as obstacle avoidance and tracking on the mobile platform.

Figure 11:
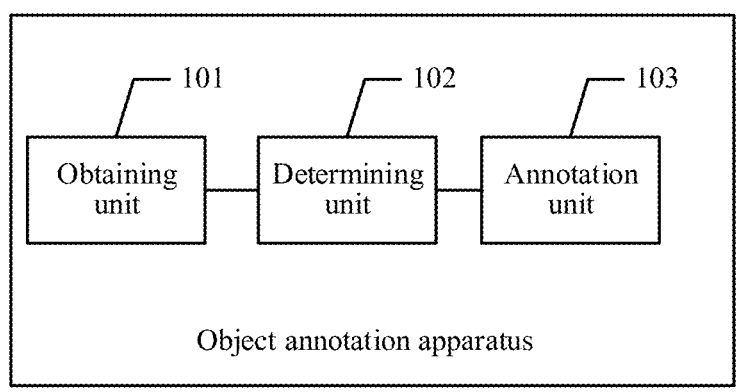
FIG. 11 is a schematic structural diagram of an object annotation apparatus according to an embodiment of this application.

Based on the description of the foregoing object annotation method embodiment, an embodiment of this application further provides a schematic structural diagram of an object annotation apparatus shown in FIG. 11. As shown in FIG. 11, the object annotation apparatus in this embodiment of this application may include: an obtaining unit 101, configured to obtain a reference image recorded by an image sensor from an environment space, the reference image including at least one reference object, the obtaining unit 101 being further configured to obtain target point cloud data obtained by a three-dimensional space sensor by scanning the environment space, the target point cloud data indicating a three-dimensional space region occupied by a target object in the environment space; a determining unit 102, configured to determine a target reference object corresponding to the target object from the reference image, the determining unit 102 being further configured to determine a projection size of the three-dimensional space region corresponding to the target point cloud data and that is projected onto the reference image; and an annotation unit 103, configured to perform three-dimensional annotation on the target reference object in the reference image according to the determined projection size. Then, a location of the target reference object in a three-dimensional space may be determined according to the three-dimensional annotation. In some embodiments, the obtaining unit 101, the determining unit 102, and the annotation unit 103 may be program units stored in one or more memories of the object annotation apparatus and executed by one or more processors of the object annotation apparatus. Each unit and other similar terms used in this disclosure (e.g., module) can be implemented using software (e.g., computer programs or algorithms developed to perform the described functions), hardware (e.g., processing circuitry and/or memory configured to perform the described functions), or a combination thereof.

In one embodiment, when determining the projection size of the three-dimensional space region corresponding to the target point cloud data and that is projected onto the reference image, the determining unit 102 may be specifically configured to: obtain object information of the target reference object; and determine, according to the object information, the projection size of the three-dimensional space region corresponding to the target point cloud data and that is projected onto the reference image.

In one embodiment, the object information includes a two-dimensional annotation size of the target reference object. Correspondingly, when determining, according to the object information, the projection size of the three-dimensional space region corresponding to the target point cloud data and that is projected onto the reference image, the determining unit 102 may be specifically configured to: obtain a height value of the two-dimensional annotation size; and determine, according to the height value, a height value in the projection size of the three-dimensional space region corresponding to the target point cloud data and that is projected onto the reference image.

In one embodiment, the object information includes a two-dimensional annotation size of the target reference object. Correspondingly, when determining, according to the object information, the projection size of the three-dimensional space region corresponding to the target point cloud data and that is projected onto the reference image, the determining unit 102 may be specifically configured to: obtain a standard size value set for the classification category, the standard size value including: a standard length value and/or a standard width value; and determine, according to the standard size value, a length value and/or a width value in the projection size of the three-dimensional space region corresponding to the target point cloud data and that is projected onto the reference image.

In one embodiment, if the standard size value includes the standard length value, correspondingly, when determining, according to the standard size value, the length value in the projection size of the three-dimensional space region corresponding to the target point cloud data and that is projected onto the reference image, the determining unit 102 may be specifically configured to: adjust a length value of the three-dimensional space region to the standard length value if a difference between the length value of the three-dimensional space region and the standard length value is greater than a preset length difference, and determine the length value in the projection size according to an adjusted length value of the three-dimensional space region.

If the standard size value includes the standard width value, correspondingly, when determining, according to the standard size value, the width value in the projection size of the three-dimensional space region corresponding to the target point cloud data and that is projected onto the reference image, the determining unit 102 may be specifically configured to: adjust a width value of the three-dimensional space region to the standard width value if a difference between the width value of the three-dimensional space region and the standard width value is greater than a preset width difference, and determine the width value in the projection size according to an adjusted width value of the three-dimensional space region.

In one embodiment, when determining the target reference object corresponding to the target object from the reference image, the determining unit 102 may be specifically configured to: perform matching processing between the target point cloud data and a reference enclosing box of the at least one reference object in the reference image, to determine a matching degree between the target object corresponding to the target point cloud data and the at least one reference object; and determine the target reference object from the at least one reference object according to the matching degree, a matching degree between the target reference object and the target object corresponding to the target point cloud data being greater than a preset threshold.

In one embodiment, when performing the matching processing between the target point cloud data and the reference enclosing box of the at least one reference object in the reference image, to determine the matching degree between the target object corresponding to the target point cloud data and the at least one reference object, the determining unit 102 may be specifically configured to: perform two-dimensional image projection on the three-dimensional space region indicated by the target point cloud data, to obtain an image projection region of the target point cloud data in the reference image; determine a minimum enclosing box of the image projection region; and perform matching calculation between the minimum enclosing box and the reference enclosing box of the at least one reference object in the reference image, to determine the matching degree between the target object corresponding to the target point cloud data and the at least one reference object.

In one embodiment, when performing the matching calculation between the minimum enclosing box and the reference enclosing box of the at least one reference object in the reference image, to determine the matching degree between the target object corresponding to the target point cloud data and the at least one reference object, the determining unit 102 may be specifically configured to: calculate an intersection over union between the minimum enclosing box and the reference enclosing box of the at least one reference object in the reference image; and take the intersection over union as the matching degree between the target object corresponding to the target point cloud data and the at least one reference object.

In one embodiment, when determining the target reference object from the at least one reference object according to the matching degree, the determining unit 102 may be specifically configured to: determine a candidate reference object from the at least one reference object according to the matching degree, a matching degree between the candidate reference object and the target object corresponding to the target point cloud data being greater than the preset threshold; and determine the target reference object according to a classification category of the candidate reference object and a classification category of the target object corresponding to the target point cloud data.

In one embodiment, when obtaining the target point cloud data obtained by the three-dimensional space sensor by scanning the environment space, the obtaining unit 101 may be specifically configured to: obtain a point cloud data frame set obtained by the three-dimensional space sensor by scanning the environment space; tracking the target object based on the point cloud data frame set, to determine point cloud trajectory data of the target object; determine reference point cloud data from the point cloud trajectory data according to a recording timestamp of the reference image; and perform interpolation processing on the reference point cloud data to obtain the target point cloud data.

In one embodiment, the point cloud data frame set includes at least two point cloud data frames, and correspondingly, when performing the tracking on the target object based on the point cloud data frame set, to determine the point cloud trajectory data of the target object, the obtaining unit 101 may be specifically configured to: perform object detection on a target point cloud data frame, to determine the target object, the target point cloud data frame being any point cloud data frame in the point cloud data frame set; obtain an associated point cloud data frame associated with the target point cloud data frame, the associated point cloud data frame including one point cloud data frame having an acquisition time earlier or later than that of the target point cloud data frame; and perform tracking processing on the target object based on the associated point cloud data frame, to determine the point cloud trajectory data of the target object.

When three-dimensional annotation is performed on an object in embodiments of this application, target point cloud data of a target object may be obtained, a projection size of a three-dimensional space region corresponding to the target point cloud data and that is projected onto a reference image is determined, and then three-dimensional annotation is performed on a target reference object, in the reference image, matching the target object according to the projection size, to accurately determine a location of the target reference object, in a two-dimensional image, in a three-dimensional space. By performing three-dimensional annotation on the target reference object in the reference image according to the target point cloud data, the annotation accuracy may be improved, an actual location of the target reference object may be accurately determined, and annotation does not need to be performed manually, which can improve the annotation efficiency, and reduce the cost of annotation.

Figure 12:
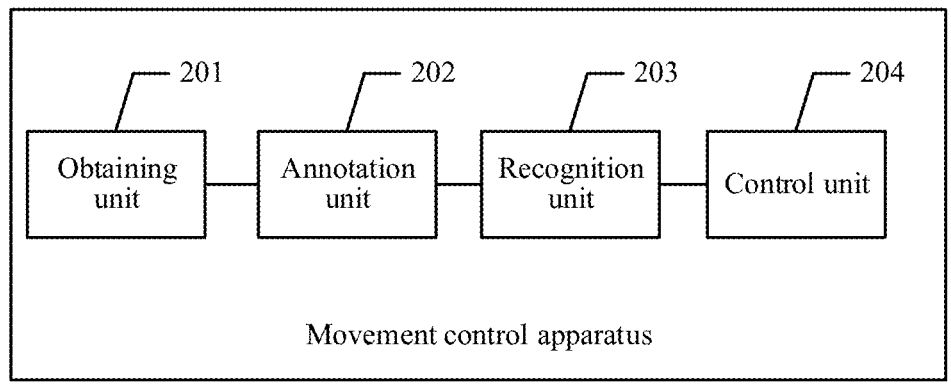
FIG. 12 is a schematic structural diagram of a movement control apparatus according to an embodiment of this application.

Based on the description of the foregoing movement control method embodiment, an embodiment of this application further provides a schematic structural diagram of a movement control apparatus shown in FIG. 12. As shown in FIG. 12, the movement control apparatus in this embodiment of this application may include: an obtaining unit 201, configured to obtain, in a moving process of a mobile platform, a reference image that is recorded from an environment space, and obtain target point cloud data obtained by scanning the environment space, the target point cloud data indicating a three-dimensional space region occupied by a target object in the environment space; an annotation unit 202, configured to perform three-dimensional annotation on at least one reference object in the reference image according to the target object and the target point cloud data, to obtain a three-dimensional annotation region; a recognition unit 203, configured to perform image recognition on the three-dimensional annotation region in the reference image, to determine parameter information of a target reference object in the three-dimensional annotation region; and a control unit 204, configured to generate a control instruction according to the parameter information, and control, according to the control instruction, the mobile platform to move. In some embodiments, the obtaining unit 201, the annotation unit 202, the recognition unit 203, and the control unit 204 may be program units stored in one or more memories of the movement control apparatus and executed by one or more processors of the movement control apparatus. Each unit and other similar terms used in this disclosure (e.g., module) can be implemented using software (e.g., computer programs or algorithms developed to perform the described functions), hardware (e.g., processing circuitry and/or memory configured to perform the described functions), or a combination thereof.

In one embodiment, when performing the three-dimensional annotation on the at least one reference object in the reference image according to the target object and the target point cloud data, to obtain the three-dimensional annotation region, the annotation unit 202 may be specifically configured to: determine a target reference object matching the target object from the at least one reference object in the reference image; determine a projection size of the three-dimensional space region corresponding to the target point cloud data and that is projected onto the reference image; and perform three-dimensional annotation on the target reference object in the reference image according to the determined projection size, to obtain the three-dimensional annotation region.

In one embodiment, when determining the target reference object matching the target object from the at least one reference object in the reference image, the annotation unit 202 may be specifically configured to: perform matching processing between the target point cloud data and a reference enclosing box of the at least one reference object in the reference image, to determine a matching degree between the target object corresponding to the target point cloud data and the at least one reference object; and determine the target reference object from the at least one reference object according to the matching degree, a matching degree between the target reference object and the target object corresponding to the target point cloud data being greater than a preset threshold.

In one embodiment, when determining the target reference object from the at least one reference object according to the matching degree, the annotation unit 202 may be specifically configured to: determine a candidate reference object from the at least one reference object according to the matching degree, a matching degree between the candidate reference object and the target object corresponding to the target point cloud data being greater than the preset threshold; and determine the target reference object according to a classification category of the candidate reference object and a classification category of the target object corresponding to the target point cloud data.

In one embodiment, when obtaining the target point cloud data obtained by scanning the environment space, the obtaining unit 201 may be specifically configured to: obtain a point cloud data frame set by scanning the environment space; tracking the target object based on the point cloud data frame set, to determine point cloud trajectory data of the target object; determine reference point cloud data from the point cloud trajectory data according to a recording timestamp of the reference image; and perform interpolation processing on the reference point cloud data to obtain the target point cloud data.

In the embodiments of this application, during the automatic moving process of the mobile platform, after the laser point cloud data of the target object and the reference image are obtained, three-dimensional annotation may be performed on the target reference object in the reference image according to the target point cloud data of the target object, thereby improving the accuracy of the three-dimensional annotation region obtained through three-dimensional annotation. After the three-dimensional annotation region is obtained, image recognition may be performed on the three-dimensional annotation region to obtain the parameter information, to more accurately determine a location of the target object, so that the control instruction is generated according to the parameter information to perform movement control such as obstacle avoidance and tracking on the mobile platform.

Figure 13:
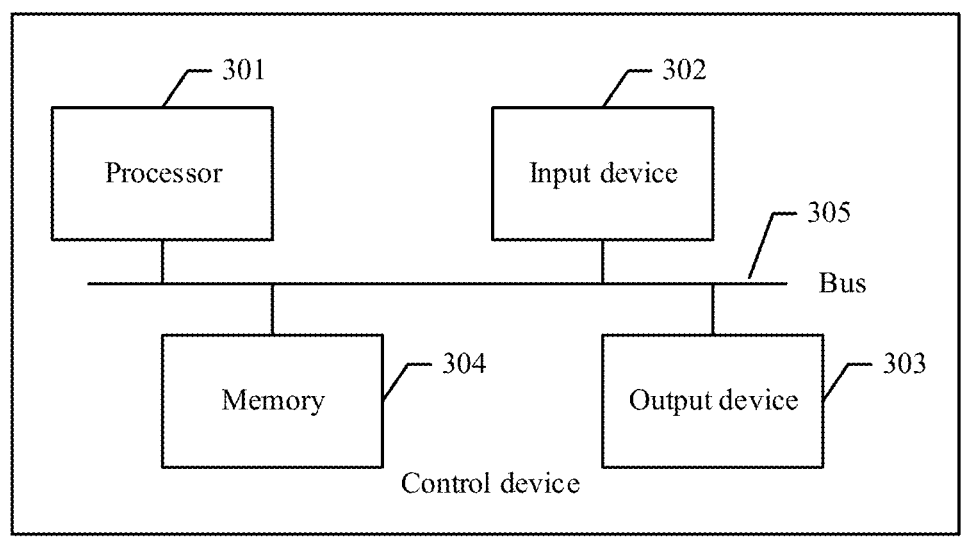
FIG. 13 is a schematic structural diagram of a control device according to an embodiment of this application.

FIG. 13 is a schematic structural diagram of a control device according to an embodiment of this application. The control device in this embodiment shown in FIG. 13 may include: one or more processors 301, one or more input devices 302, one or more input devices 303, and a memory 304. The processor 301, the input device 302, the output device 303, and the memory 304 are connected through a bus 305. The memory 304 is configured to store a computer program, and the computer program includes program instructions. The processor 301 is configured to execute the program instructions stored in the memory 304.

In one embodiment, the processor 301 may be a central processing unit (CPU). The processor may alternatively be another general-purpose processor, that is, a microprocessor or any conventional processor. The memory 304 may include any computer storage medium such as a read-only memory and a random access memory, and provide instructions and data to the processor 301. Therefore, the processor 301 and the memory 304 are not limited herein.

In this embodiment of this application, the processor 301 loads and executes one or more first program instructions stored in a computer storage medium, to implement the corresponding steps of the foregoing object annotation method embodiment. In one embodiment, the at least one first program instruction in the computer storage medium is loaded by the processor 301 to perform the following steps: obtaining a reference image recorded by an image sensor from an environment space, the reference image including at least one reference object; obtaining target point cloud data obtained by a three-dimensional space sensor by scanning the environment space, the target point cloud data indicating a three-dimensional space region occupied by a target object in the environment space; determining a target reference object corresponding to the target object from the reference image; determining a projection size of the three-dimensional space region corresponding to the target point cloud data and that is projected onto the reference image; and performing three-dimensional annotation on the target reference object in the reference image according to the determined projection size.

In an embodiment, during the determining of the projection size of the three-dimensional space region corresponding to the target point cloud data and that is projected onto the reference image, the at least one first program instruction may be loaded by the processor 301 and is specifically configured to perform the following steps: obtaining object information of the target reference object; and determining, according to the object information, the projection size of the three-dimensional space region corresponding to the target point cloud data and that is projected onto the reference image.

In an embodiment, the object information includes a two-dimensional annotation size of the target reference object. Correspondingly, during the determining of, according to the object information, the projection size of the three-dimensional space region corresponding to the target point cloud data and that is projected onto the reference image, the at least one first program instruction may be loaded by the processor 301 and is specifically configured to perform the following steps: obtaining a height value of the two-dimensional annotation size; and determining, according to the height value, a height value in the projection size of the three-dimensional space region corresponding to the target point cloud data and that is projected onto the reference image.

In an embodiment, the object information includes a two-dimensional annotation size of the target reference object. Correspondingly, during the determining of, according to the object information, the projection size of the three-dimensional space region corresponding to the target point cloud data and that is projected onto the reference image, the at least one first program instruction may be loaded by the processor 301 and is specifically configured to perform the following steps: obtaining a standard size value set for the classification category, the standard size value including: a standard length value and/or a standard width value; and determining, according to the standard size value, a length value and/or a width value in the projection size of the three-dimensional space region corresponding to the target point cloud data and that is projected onto the reference image.

In one embodiment, if the standard size value includes the standard length value, during the determining of, according to the standard size value, the length value in the projection size of the three-dimensional space region corresponding to the target point cloud data and that is projected onto the reference image, the at least one first program instruction may be loaded by the processor 301 and is specifically configured to perform the following steps: adjusting a length value of the three-dimensional space region to the standard length value in a case that a difference between the length value of the three-dimensional space region and the standard length value is greater than a preset length difference, and determining the length value in the projection size according to an adjusted length value of the three-dimensional space region.

If the standard size value includes the standard width value, during the determining of, according to the standard size value, the width value in the projection size of the three-dimensional space region corresponding to the target point cloud data and that is projected onto the reference image, the at least one first program instruction may be loaded by the processor 301 and is specifically configured to perform the following steps: adjusting a width value of the three-dimensional space region to the standard width value in a case that a difference between the width value of the three-dimensional space region and the standard width value is greater than a preset width difference, and determining the width value in the projection size according to an adjusted width value of the three-dimensional space region.

In one embodiment, during the determining of the target reference object corresponding to the target object from the reference image, the at least one first program instruction may be loaded by the processor 301 and is specifically configured to perform the following steps: matching the target point cloud data and a reference enclosing box of the at least one reference object in the reference image, to determine a matching degree between the target object corresponding to the target point cloud data and the at least one reference object; and determining the target reference object from the at least one reference object according to the matching degree, a matching degree between the target reference object and the target object corresponding to the target point cloud data being greater than a preset threshold.

In one embodiment, during the performing of the matching processing between the target point cloud data and the reference enclosing box of the at least one reference object in the reference image, to determine the matching degree between the target object corresponding to the target point cloud data and the at least one reference object, the at least one first program instruction may be loaded by the processor 301 and is specifically configured to perform the following steps: performing two-dimensional image projection on the three-dimensional space region indicated by the target point cloud data, to obtain an image projection region of the target point cloud data in the reference image; determining a minimum enclosing box of the image projection region; and performing matching calculation between the minimum enclosing box and the reference enclosing box of the at least one reference object in the reference image, to determine the matching degree between the target object corresponding to the target point cloud data and the at least one reference object.

In one embodiment, during the performing of the matching calculation between the minimum enclosing box and the reference enclosing box of the at least one reference object in the reference image, to determine the matching degree between the target object corresponding to the target point cloud data and the at least one reference object, the at least one first program instruction may be loaded by the processor 301 and is specifically configured to perform the following steps: calculating an intersection over union between the minimum enclosing box and the reference enclosing box of the at least one reference object in the reference image; and using the intersection over union as the matching degree between the target object corresponding to the target point cloud data and the at least one reference object.

In one embodiment, during the performing of the target reference object from the at least one reference object according to the matching degree, the at least one first program instruction may be loaded by the processor 301 and is specifically configured to perform the following steps: determining a candidate reference object from the at least one reference object according to the matching degree, a matching degree between the candidate reference object and the target object corresponding to the target point cloud data being greater than the preset threshold; and determining the target reference object according to a classification category of the candidate reference object and a classification category of the target object corresponding to the target point cloud data.

In one embodiment, during the obtaining of the target point cloud data obtained by the three-dimensional space sensor by scanning the environment space, the at least one first program instruction may be loaded by the processor 301 and is specifically configured to perform the following steps: obtaining a point cloud data frame set obtained by the three-dimensional space sensor by scanning the environment space; performing tracking on the target object based on the point cloud data frame set, to determine point cloud trajectory data of the target object; determining reference point cloud data from the point cloud trajectory data according to a recording timestamp of the reference image; and performing interpolation on the reference point cloud data to obtain the target point cloud data.

In one embodiment, the point cloud data frame set includes at least two point cloud data frames, and during the performing of the tracking on the target object based on the point cloud data frame set, to determine the point cloud trajectory data of the target object, the at least one first program instruction may be loaded by the processor 301 and is specifically configured to perform the following steps: perform object detection on a target point cloud data frame, to determine the target object, the target point cloud data frame being any point cloud data frame in the point cloud data frame set; obtaining an associated point cloud data frame associated with the target point cloud data frame, the associated point cloud data frame including one point cloud data frame having an acquisition time earlier or later than that of the target point cloud data frame; and performing tracking processing on the target object based on the associated point cloud data frame, to determine the point cloud trajectory data of the target object.

When three-dimensional annotation is performed on an object in the embodiments of this application, target point cloud data of a target object may be obtained, a projection size of a three-dimensional space region corresponding to the target point cloud data and that is projected onto a reference image is determined, and then three-dimensional annotation is performed on a target reference object, in the reference image, matching the target object according to the projection size, to accurately determine a location of the target reference object, in a two-dimensional image, in a three-dimensional space. By performing three-dimensional annotation on the target reference object in the reference image according to the target point cloud data, the annotation accuracy may be improved, an actual location of the target reference object may be accurately determined, and annotation does not need to be performed manually, which can improve the annotation efficiency, and reduce the cost of annotation.

In another embodiment, the processor 301 may further load and execute one or more second program instructions stored in a computer storage medium, to implement the corresponding steps of the foregoing movement control method embodiment. In one embodiment, the at least one second program instruction in the computer storage medium is loaded by the processor 301 to perform the following steps: obtaining, in a moving process of a mobile platform, a reference image that is recorded from an environment space, and obtaining target point cloud data obtained by scanning the environment space, the target point cloud data indicating a three-dimensional space region occupied by a target object in the environment space; performing three-dimensional annotation on at least one reference object in the reference image according to the target object and the target point cloud data, to obtain a three-dimensional annotation region; performing image recognition on the three-dimensional annotation region in the reference image, to determine parameter information of a target reference object in the three-dimensional annotation region; and generating a control instruction according to the parameter information, and controlling, according to the control instruction, the mobile platform to move.

In one embodiment, during the performing of the three-dimensional annotation on the at least one reference object in the reference image according to the target object and the target point cloud data, to obtain the three-dimensional annotation region, the at least one second program instruction may be loaded by the processor 301 and is specifically configured to perform the following steps: determining a target reference object matching the target object from the at least one reference object in the reference image; determining a projection size of the three-dimensional space region corresponding to the target point cloud data and that is projected onto the reference image; and performing three-dimensional annotation on the target reference object in the reference image according to the determined projection size, to obtain the three-dimensional annotation region.

In one embodiment, during the determining of the target reference object matching the target object from the at least one reference object in the reference image, the at least one second program instruction may be loaded by the processor 301 and is specifically configured to perform the following steps: matching the target point cloud data and a reference enclosing box of the at least one reference object in the reference image, to determine a matching degree between the target object corresponding to the target point cloud data and the at least one reference object; and determining the target reference object from the at least one reference object according to the matching degree, a matching degree between the target reference object and the target object corresponding to the target point cloud data being greater than a preset threshold.

In one embodiment, during the determining of the target reference object from the at least one reference object according to the matching degree, the at least one second program instruction may be loaded by the processor 301 and is specifically configured to perform the following steps: determining a candidate reference object from the at least one reference object according to the matching degree, a matching degree between the candidate reference object and the target object corresponding to the target point cloud data being greater than the preset threshold; and determining the target reference object according to a classification category of the candidate reference object and a classification category of the target object corresponding to the target point cloud data.

In one embodiment, during the obtaining of the target point cloud data obtained by scanning the environment space, the at least one second program instruction may be loaded by the processor 301 and is specifically configured to perform the following steps: obtaining a point cloud data frame set by scanning the environment space; tracking the target object based on the point cloud data frame set, to determine point cloud trajectory data of the target object; determining reference point cloud data from the point cloud trajectory data according to a recording timestamp of the reference image; and performing interpolation on the reference point cloud data to obtain the target point cloud data.

In the embodiments of this application, during the automatic moving process of the mobile platform, after the laser point cloud data of the target object and the reference image are obtained, three-dimensional annotation may be performed on the target reference object in the reference image according to the target point cloud data of the target object, thereby improving the accuracy of the three-dimensional annotation region obtained through three-dimensional annotation. After the three-dimensional annotation region is obtained, image recognition may be performed on the three-dimensional annotation region to obtain the parameter information, to more accurately determine a location of the target object, so that the control instruction is generated according to the parameter information to perform movement control such as obstacle avoidance and tracking on the mobile platform.

For a specific working process of the terminal and units described above, reference may be made to the related descriptions in the foregoing embodiments. Details are not described herein again.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments may be performed. The storage medium may be a magnetic disk, an optical disc, a read-only memory (ROM), a random access memory (RAM), or the like.

The foregoing descriptions are merely some embodiments of this application, and are not intended to limit the scope of this application. A person of ordinary skill in the art may understand all or some processes of the foregoing embodiments, and equivalent modifications made according to the claims of this application shall still fall within the scope of the present disclosure.

What is claimed is:
1. An object annotation method, comprising:
obtaining a reference image of an environment space, the reference image comprising at least one reference object;
obtaining target point cloud data by scanning the environment space with a three-dimensional space sensor, the target point cloud data indicating a three-dimensional space region occupied by a target object in the environment space;
determining a target reference object corresponding to the target object from the reference image;
classifying, based on the target point cloud data, the target reference object into a corresponding classification category, to obtain an object information of the target reference object, wherein the object information includes the classification category of the target reference object;
obtaining a standard size value set for the classification category of the target reference object;
determining, according to the standard size value, a projection size of the three-dimensional space region corresponding to the target point cloud data and the three-dimensional space region being projected onto the reference image; and
performing three-dimensional annotation on the target reference object in the reference image according to the determined projection size.

2. The method according to claim 1, wherein the object information comprises a two-dimensional annotation size of the target reference object; and the method further comprises:
- obtaining a height value of the two-dimensional annotation size; and
- determining, according to the height value, a height value in the projection size of the three-dimensional space region corresponding to the target point cloud data and the three-dimensional space region being projected onto the reference image.

3. The method according to claim 1, wherein
the standard size value comprises a standard length value and/or a standard width value; and
the method further comprises: determining, according to the standard size value, a length value and a width value in the projection size of the three-dimensional space region corresponding to the target point cloud data and the three-dimensional space region being projected onto the reference image.

4. The method according to claim 3, wherein
in response to that the standard size value comprises the standard length value, the determining, according to the standard size value, a length value in the projection size of the three-dimensional space region corresponding to the target point cloud data and the three-dimensional space region being projected onto the reference image comprises:
- adjusting a length value of the three-dimensional space region to the standard length value in response to that a difference between the length value of the three-dimensional space region and the standard length value is greater than a preset length difference, and determining the length value in the projection size according to an adjusted length value of the three-dimensional space region; and in response to that the standard size value comprises the standard width value, the determining, according to the standard size value, a width value in the projection size of the three-dimensional space region corresponding to the target point cloud data and the three-dimensional space region being projected onto the reference image comprises:
- adjusting a width value of the three-dimensional space region to the standard width value in response to that a difference between the width value of the three-dimensional space region and the standard width value is greater than a preset width difference, and determining the width value in the projection size according to an adjusted width value of the three-dimensional space region.

5. The method according to claim 1, wherein the determining a target reference object corresponding to the target object from the reference image comprises:
- matching the target point cloud data and a reference enclosing box of the at least one reference object in the reference image, to determine a matching degree between the target object corresponding to the target point cloud data and the at least one reference object; and
- determining the target reference object from the at least one reference object according to the matching degree, the matching degree between the target reference object and the target object corresponding to the target point cloud data being greater than a preset threshold.

6. The method according to claim 5, wherein the matching the target point cloud data and a reference enclosing box of the at least one reference object in the reference image, to determine a matching degree between the target object corresponding to the target point cloud data and the at least one reference object comprises:
- performing two-dimensional image projection on the three-dimensional space region corresponding to the target point cloud data, to obtain an image projection region of the target point cloud data in the reference image;
- determining a minimum enclosing box of the image projection region; and
- calculating the matching degree between the target object corresponding to the target point cloud data and the at least one reference object based on matching the minimum enclosing box and the reference enclosing box of the at least one reference object in the reference image.

7. The method according to claim 6, wherein calculating the matching degree between the target object corresponding to the target point cloud data and the at least one reference object based on matching the minimum enclosing box and the reference enclosing box of the at least one reference object in the reference image comprises:
- calculating an intersection over union between the minimum enclosing box and the reference enclosing box of the at least one reference object in the reference image; and
- using the intersection over union as the matching degree between the target object corresponding to the target point cloud data and the at least one reference object.

8. The method according to claim 5, wherein the determining the target reference object from the at least one reference object according to the matching degree comprises:
- determining a candidate reference object from the at least one reference object according to the matching degree, the matching degree between the candidate reference object and the target object corresponding to the target point cloud data being greater than the preset threshold; and
- determining the target reference object according to a classification category of the candidate reference object and a classification category of the target object corresponding to the target point cloud data.

9. The method according to claim 1, wherein the obtaining target point cloud data by scanning the environment space with a three-dimensional space sensor comprises:
- obtaining a point cloud data frame set by scanning the environment space with the three-dimensional space sensor;
- tracking the target object based on the point cloud data frame set, to determine point cloud trajectory data of the target object;
- determining reference point cloud data from the point cloud trajectory data according to a recording timestamp of the reference image; and
- performing interpolation on the reference point cloud data to obtain the target point cloud data.

10. The method according to claim 9, wherein the point cloud data frame set comprises at least two point cloud data frames, and the tracking on the target object based on the point cloud data frame set, to determine point cloud trajectory data of the target object comprises:
- performing object detection on a target point cloud data frame, to determine the target object, the target point cloud data frame being a point cloud data frame in the point cloud data frame set;

obtaining an associated point cloud data frame associated with the target point cloud data frame, the associated point cloud data frame comprising one point cloud data frame having an acquisition time earlier or later than that of the target point cloud data frame; and tracking the target object based on the associated point cloud data frame, to determine the point cloud trajectory data of the target object.

11. An object annotation apparatus, comprising: at least one memory storing computer readable instructions, and at least one processor configured, when executing the computer readable instructions, to perform:

obtaining a reference image of an environment space, the reference image comprising at least one reference object;

obtaining target point cloud data by scanning the environment space with a three-dimensional space sensor, the target point cloud data indicating a three-dimensional space region occupied by a target object in the environment space;

determining a target reference object corresponding to the target object from the reference image;

classifying, based on the target point cloud data, the target reference object into a corresponding classification category, to obtain an object information of the target reference object, wherein the object information includes the classification category of the target reference object;

obtaining a standard size value set for the classification category of the target reference object;

determining, according to the standard size value, a projection size of the three-dimensional space region corresponding to the target point cloud data and the three-dimensional space region being projected onto the reference image; and performing three-dimensional annotation on the target reference object in the reference image according to the determined projection size.

12. The apparatus according to claim 11, wherein the object information comprises a two-dimensional annotation size of the target reference object; and the at least one processor is configured to perform:

obtaining a height value of the two-dimensional annotation size; and determining, according to the height value, a height value in the projection size of the three-dimensional space region corresponding to the target point cloud data and the three-dimensional space region being projected onto the reference image.

13. The apparatus according to claim 11, wherein the standard size value comprises:

a standard length value and/or a standard width value; and the at least one processor is configured to perform:

determining, according to the standard size value, a length value and a width value in the projection size of the three-dimensional space region corresponding to the target point cloud data and the three-dimensional space region being projected onto the reference image.

14. The apparatus according to claim 13, wherein:

in response to that the standard size value comprises the standard length value, the determining, according to the standard size value, a length value in the projection size of the three-dimensional space region corresponding to the target point cloud data and the three-dimensional space region being projected onto the reference image comprises:

adjusting a length value of the three-dimensional space region to the standard length value in response to that a difference between the length value of the three-dimensional space region and the standard length value is greater than a preset length difference, and determining the length value in the projection size according to an adjusted length value of the three-dimensional space region; and in response to that the standard size value comprises the standard width value, the determining, according to the standard size value, a width value in the projection size of the three-dimensional space region corresponding to the target point cloud data and the three-dimensional space region being projected onto the reference image comprises:

adjusting a width value of the three-dimensional space region to the standard width value in response to that a difference between the width value of the three-dimensional space region and the standard width value is greater than a preset width difference, and determining the width value in the projection size according to an adjusted width value of the three-dimensional space region.

15. The apparatus according to claim 11, wherein the determining a target reference object corresponding to the target object from the reference image comprises:

matching the target point cloud data and a reference enclosing box of the at least one reference object in the reference image, to determine a matching degree between the target object corresponding to the target point cloud data and the at least one reference object; and determining the target reference object from the at least one reference object according to the matching degree, the matching degree between the target reference object and the target object corresponding to the target point cloud data being greater than a preset threshold.

16. The apparatus according to claim 15, wherein the determining the target reference object from the at least one reference object according to the matching degree comprises:

determining a candidate reference object from the at least one reference object according to the matching degree, the matching degree between the candidate reference object and the target object corresponding to the target point cloud data being greater than the preset threshold; and determining the target reference object according to a classification category of the candidate reference object and a classification category of the target object corresponding to the target point cloud data.

17. The apparatus according to claim 15, wherein the matching the target point cloud data and a reference enclosing box of the at least one reference object in the reference image, to determine a matching degree between the target object corresponding to the target point cloud data and the at least one reference object comprises:

performing two-dimensional image projection on the three-dimensional space region corresponding to the target point cloud data, to obtain an image projection region of the target point cloud data in the reference image;

determining a minimum enclosing box of the image projection region; and calculating the matching degree between the target object corresponding to the target point cloud data and the at least one reference object based on matching the minimum enclosing box and the reference enclosing box of the at least one reference object in the reference image.

18. The apparatus according to claim 17, wherein calculating the matching degree between the target object corresponding to the target point cloud data and the at least one reference object based on matching the minimum enclosing box and the reference enclosing box of the at least one reference object in the reference image comprises:
calculating an intersection over union between the minimum enclosing box and the reference enclosing box of the at least one reference object in the reference image; and
using the intersection over union as the matching degree between the target object corresponding to the target point cloud data and the at least one reference object.

19. The apparatus according to claim 11, wherein the obtaining target point cloud data by scanning the environment space with a three-dimensional space sensor comprises:
obtaining a point cloud data frame set by scanning the environment space with the three-dimensional space sensor;
tracking the target object based on the point cloud data frame set, to determine point cloud trajectory data of the target object;
determining reference point cloud data from the point cloud trajectory data according to a recording timestamp of the reference image; and
performing interpolation on the reference point cloud data to obtain the target point cloud data.

20. A non-transitory computer readable storage medium, the computer storage medium storing a computer program instruction that, when executed, causing at least one processor to perform:
obtaining a reference image of an environment space, the reference image comprising at least one reference object;
obtaining target point cloud data by scanning the environment space with a three-dimensional space sensor, the target point cloud data indicating a three-dimensional space region occupied by a target object in the environment space;
determining a target reference object corresponding to the target object from the reference image;
classifying, based on the target point cloud data, the target reference object into a corresponding classification category, to obtain an object information of the target reference object, wherein the object information includes the classification category of the target reference object;
obtaining a standard size value set for the classification category of the target reference object;
determining, according to the standard size value, a projection size of the three-dimensional space region corresponding to the target point cloud data and the three-dimensional space region being projected onto the reference image; and
performing three-dimensional annotation on the target reference object in the reference image according to the determined projection size.

* * * * *